(12) United States Patent
Suto et al.

(10) Patent No.: US 8,618,810 B2
(45) Date of Patent: Dec. 31, 2013

(54) IDENTIFYING FUEL CELL DEFECTS

(75) Inventors: Anthony J. Suto, Sterling, MA (US);
Alexander H. Slocum, Bow, NH (US);
R. Scott Ziegenhagen, Bedford, NH (US)

(73) Assignee: Teradyne, Inc., North Reading, MA (US)

( * ) Notice: Subject to any disclaimer, the term of this patent is extended or adjusted under 35 U.S.C. 154(b) by 402 days.

(21) Appl. No.: 13/040,600

(22) Filed: Mar. 4, 2011

(65) Prior Publication Data

US 2012/0225366 A1    Sep. 6, 2012

(51) Int. Cl.
*G01R 31/00* (2006.01)
(52) U.S. Cl.
USPC ........................................ 324/522; 324/555
(58) Field of Classification Search
USPC ................................. 324/522, 555
See application file for complete search history.

(56) References Cited

U.S. PATENT DOCUMENTS 7,292,042 B2 * 11/2007 Morita et al. ................. 324/509
7,439,746 B2   10/2008 Williams
2005/0231214 A1   10/2005 Howard et al.
2006/0078788 A1    4/2006 Ramschak
2007/0126416 A1    6/2007 Zhu et al.
2009/0325006 A1   12/2009 Yagi et al.
2011/0256464 A1 * 10/2011 Muramatsu ................... 429/465

OTHER PUBLICATIONS

International Search Report and Written Opinion from PCT Application No. PCT/US2012/026907 dated Sep. 27, 2012.

* cited by examiner

*Primary Examiner* — Vincent Q Nguyen
(74) *Attorney, Agent, or Firm* — Wolf, Greenfield & Sacks, P.C.

(57) ABSTRACT

A test system for testing a unit such as multiple solid oxide fuel cells. The test system includes a thermal test chamber in which a non-contact electrostatic voltage probe is mounted to scan the solid oxide fuel cells. The test system includes a detector coupled to the voltage probe to produce an output signal or display based on the measured voltages. The measured voltages are processed to compute a representative voltage for each fuel cell and to identify any defective fuel cells based on the measured voltages. The test system may be used during manufacture of solid oxide fuel cell stacks for cost effective testing to lower manufacturing costs.

10 Claims, 14 Drawing Sheets

IDENTIFYING FUEL CELL DEFECTS

BACKGROUND

1. Field of the Invention

The invention relates generally to the manufacture of fuel cells, and more particularly to the testing of fuel cells.

2. Related Art

Fuel cells are used as sources of energy in a wide variety of applications in diverse industries ranging from telecommunications and health services to transportation and defense. An important type of fuel cell, which uses a solid oxide or ceramic electrolyte, is known as a solid oxide fuel cell (SOFC). A typical solid oxide fuel cell is a few millimeters thick and does not provide adequate power for most applications. Typically, multiple SOFCs are connected together to increase the output voltage and/or current, with the resultant set of connected SOFCs termed an SOFC "stack."

Despite the known importance of fuel cell stacks, the cost of manufacturing them remains high, and it would be advantageous to reduce this cost to fully realize the potential that fuel cells have to offer. During the manufacture of fuel cells stacks, each stack is tested to ensure that all the fuel cells in it are working properly. The cost of the testing process, however, is a major contributing factor to the overall manufacturing cost. Accordingly, one way to reduce manufacturing cost is to reduce the cost of testing fuel cell stacks.

One way to test whether a fuel cell is functioning properly is to measure the voltage it outputs. The fuel cell may be activated and provided with fuel; the resultant voltage output may be measured and analyzed. Deviations in the measured voltage from the voltage that the fuel cell is expected to output may indicate that the fuel cell is defective.

At room temperature, the ceramic electrolytes used in SOFCs behave as insulators, and they do not become electrically active until they reach much higher temperatures. As a result, SOFCs and SOFC stacks operate at very high temperatures, typically over 500 degrees Celsius, which considerably complicates testing SOFCs because the testing process must also be performed at these high temperatures.

In the art, it is known to test a fuel cell stack by welding high-temperature wires to each fuel cell. The SOFC stack is placed in a furnace, with the high-temperature wires connected to a high-precision voltmeter outside the furnace. The voltage potential on each individual fuel cell may then be measured and analyzed to detect defects.

If the analysis of measured voltage potentials reveals that a fuel cell in a fuel cell stack is not operating fully as desired, the manufacturing process of the fuel cell stack may be altered. For example, following testing, functioning fuel cell stacks may be packaged for shipping, whereas stacks with faulty fuel cells may be discarded or reworked to replace the faulty cells.

This conventional SOFC testing process is expensive. The equipment, such as high-temperature wires, the time and labor required to weld these wires to individual fuel cells and to unweld these wires from the fuel cells all contribute to the high cost. Moreover, unwelding the high-temperature wires after testing may damage the fuel cells. This conventional approach is not amenable to high-throughput manufacturing.

SUMMARY

Some aspects of the present disclosure may be embodied as a method of testing a unit comprising a fuel cell. The method may include obtaining non-contact voltage measurements of the unit. The measured voltages may be used to determine the voltage of the fuel cell and whether the fuel cell contains a defect.

Other aspects of the present disclosure relate to a method for manufacturing a fuel cell stack. The manufacturing process may include testing a fuel cell in the fuel cell stack for defects, and conditionally performing a manufacturing operation based on the test results.

Still other aspects of the present disclosure may be embodied as a test system for testing a unit. The test system may include a thermal test chamber, the test chamber comprising a non-contact electrostatic sensor head for measuring voltages and a platform adapted to hold the unit. The test system may also include a motor coupled between the non-contact electrostatic sensor head and the platform to provide relative motion between the sensor head and the platform. The system may also include a detector, coupled to the non-contact electrostatic sensor head, for producing an output signal or display based on the measured voltages.

Still other aspects of the present disclosure may be embodied as a system for testing a unit comprising a fuel cell. The system may include a thermal test chamber, the test chamber comprising a sensor head and a platform adapted to hold the unit. The system may also include a motor coupled between the sensor head and the platform to provide relative motion between them. The system may also include an electrostatic voltmeter, coupled to the sensor head, for producing an output signal or display based on a measurement made with the sensor head.

The foregoing is a non-limiting summary of the invention, which is defined by the attached claims.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 9c is a cross section through a portion of a sensor plate of the flat, rectangular sensor element of FIG. 9a.

DETAILED DESCRIPTION

The inventors have recognized and appreciated that new test techniques may appreciably decrease the manufacturing cost of solid oxide fuel cells. In some embodiments, testing may be performed with a non-contact sensor that can measure voltage of a fuel cell or other unit under test such that proper or faulty operation of the fuel cell or the unit under test can be assessed.

The non-contact sensor may be scanned along a unit under test to generate a sequence of measurements that may be analyzed to determine whether the unit or, in some embodiments, components within the unit are functioning properly. In embodiments in which tests are performed on a fuel cell stack, the measurements made while scanning the fuel cell stack may be analyzed to reveal voltages at locations along the stack, for instance to reveal voltages of individual fuel cells in the stack.

To support testing at high temperatures, the non-contact sensor may include a sensor head configured to take accurate measurements at high temperatures. A test system may include a thermal test chamber with the sensor head in the thermal chamber. The sensor head may be connected to a detector outside of the test chamber. The system may incorporate a drive mechanism that induces relative motion of the sensor head and a unit under test, such that an appropriate sequence of measurements may be made with the sensor head as it is scanned along the unit under test.

In some embodiments, there may be no physical contact between the non-contact sensor and any surface of the unit under test. Though in other embodiments, the non-contact sensor may comprise material that may be in contact with a surface of the unit under test without altering the measurement. For instance, the sensor head may comprise non-conducting nubs that may be in contact with a surface of the unit under test and may keep the sensor head at a fixed distance from the surface. Accordingly, as used herein, "non-contact" or "non-contacting" may describe measurement components and techniques that do not require ohmic contact to measure an electrical property, even if some physical contact is made for other reasons.

Figure 1:
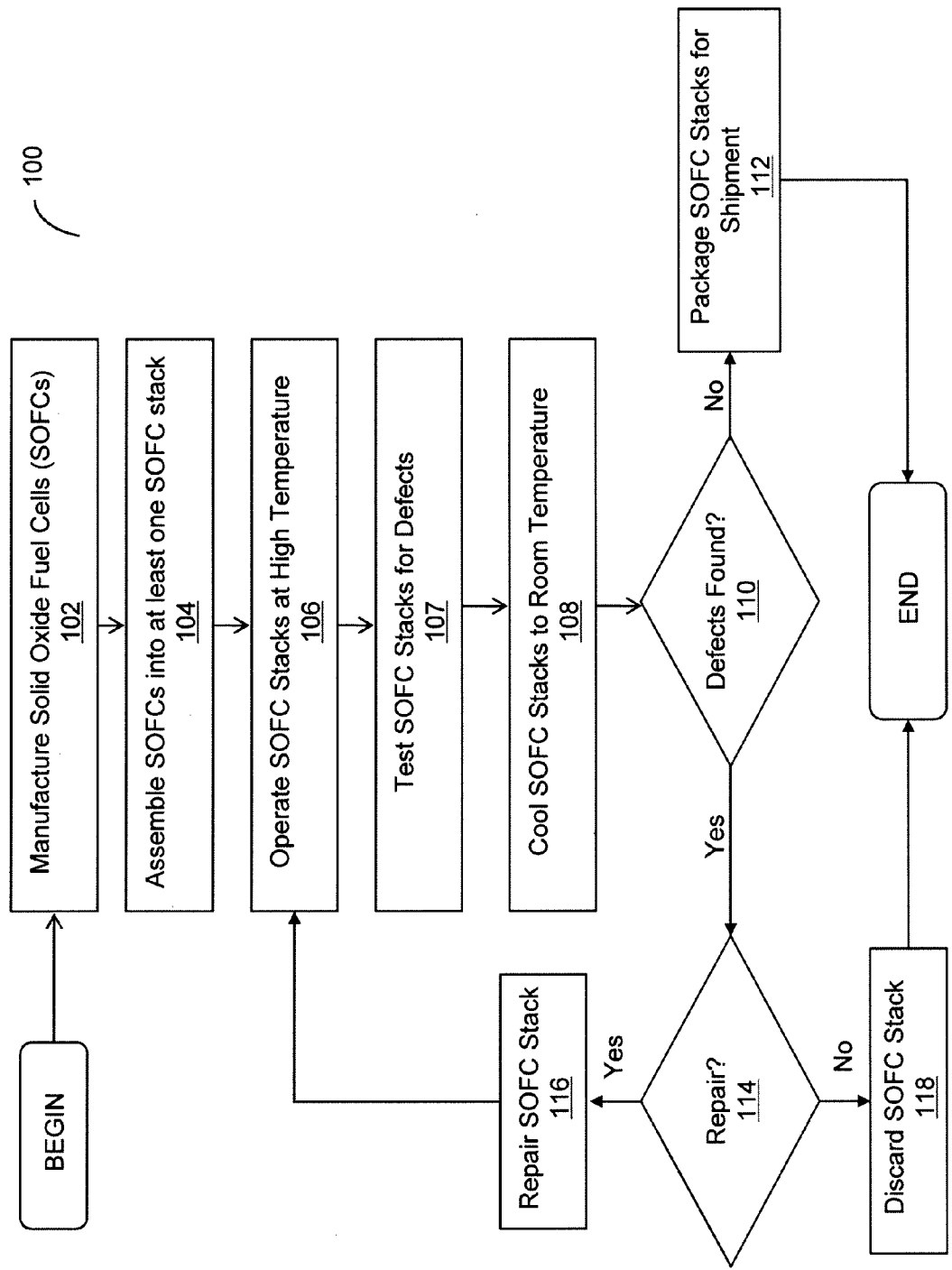
FIG. 1 is a flow chart of an illustrative process for manufacturing a fuel cell stack, in accordance with some embodiments of this disclosure.

As an example of the types of units that may be tested, FIG. 1 shows an illustrative fuel cell manufacturing process 100. The process 100 may begin with the manufacture of solid oxide fuel cells (SOFCs), in act 102. Any suitable process may be employed to manufacture the solid oxide fuel cells, including processes as are known in the art.

The manufactured solid oxide fuel cells may be assembled into one or more SOFC stacks, in act 104. A SOFC stack may comprise one or multiple solid oxide fuel cells. For instance, an SOFC stack may include 10, 25, 50, 100 or any other suitable number of fuel cells. Fuel cells in a stack may be connected in any of numerous ways. In some embodiments, fuel cells in a stack may be connected serially. In exemplary embodiments described herein, fuel cells in a stack are connected serially such that the voltage at each fuel cell, relative to a reference potential that may be established at one end of the stack, increases for each successive fuel cell that is generating a voltage. In other embodiments, fuel cells in a stack may be connected in parallel or they may be combined in a configuration of an arbitrary circuit.

The assembled SOFC stacks may be operated at a high temperature, in act 106. The high temperature may be any suitable temperature for operating solid oxide fuel cells. The temperature may be selected to be consistent with a designed operating temperature of the fuel cells. Though, in some embodiments, the temperature used for testing may be higher than the designed operating temperature to stress the fuel cells for testing. For instance, the temperature may be a temperature greater than 500 degrees Celsius, such as a temperature in the range of 500-1100 degrees Celsius. As a specific example, the temperature may be 850 degrees Celsius. The temperature need not remain constant during operation of the SOFC stacks and may fluctuate.

As part of testing, other conditions may be established. For example, fuel may be added to the SOFC stacks to operate the fuel cell stacks at a high temperature. These, and other, test conditions may be established using criteria and techniques as are known in the art or in any other suitable way.

As the SOFC stacks are being operated at a high temperature, they may be tested for the presence of defects, in act 107. Testing for the presence of defects may comprise testing one or more fuel cells for the presence of defects. Such tests may be performed on the fuel cells in a single stack or may be performed on fuel cells in multiple stacks in parallel. For instance, one or more cells in an SOFC stack may be tested for defects. As another example, one or more fuel cells in a first fuel cell stack and one or more fuel cells in a second fuel cell stack may be tested for defects. The process of testing fuel cell stacks for defects is further discussed below, with reference to FIGS. 5 and 6.

After the SOFC stacks are tested for defects at a high temperature, they may be cooled to room temperature, in act 108.

Thereafter, the SOFC stacks may be conditionally processed based on the results of the test performed on each stack. The testing for defects may be performed in a manufacturing facility in which fabrication, packaging or other operations are performed during manufacture of fuel cells. Performance of one or more of these operations, or other suitable manufacturing operations, may be conditionally performed based on the results of a test.

In act 110 of the fuel cell manufacturing process 100, a check may be performed of whether any defects were identified in any tested fuel cells. One or more manufacturing operation may be conditionally performed based on the results of this check. As a result, manufacturing operations performed when a defect is found may be different from the manufacturing operations performed when no defects are found.

If no defects are identified, the process may branch to act 112 where any of numerous manufacturing actions may be taken. For instance, the SOFC stacks may be packaged, labeled and/or otherwise prepared for shipment in act 112. Additionally or alternatively, the SOFC stacks may be stored for subsequent sales and/or shipment. Regardless of the specific acts performed on a fully functioning fuel cell stack, once those operations are completed in act 112, the process may end for the specific fuel cell stack under test. Though, it should be appreciated process 100 may be performed on each of multiple fuel cell stacks concurrently such that processing for other stacks may continue once processing is completed on one stack. Moreover, it should be appreciated that the process 100 may be repeated for each of multiple fuel cell stacks as the fuel cell stacks are manufactured.

In scenarios in which a defect is found, the process may branch to act 114 such that the manufacturing process may involve different manufacturing operations if it is determined that one or more defects were found, during testing at act 110.

Though any suitable processing may be performed when a defect is identified, in the embodiment illustrated, a check is performed to determine whether any identified defects may be repaired, in act 114. When the identified defects in an SOFC stack cannot be repaired, the SOFC stack may be discarded, in act 118. Thereafter, processing for that stack may end.

Conversely, if identified defects are of a type that can be repaired, then the SOFC stack may be reworked in act 116. Rework in act 116 may include, for example, an attempt to repair one or more defective fuel cells or to replace them in the stack. Following rework in act 116, the manufacturing process 100 may loop back to act 106 so that the reworked fuel cell stack may be re-tested to ensure that no defects remain (or are introduced by the repairs) in the repaired SOFC stack. The process may loop in this fashion until the fuel cell stack has been tested and found to contain no defects or until a condition is detected, at act 114 for which rework is deemed not appropriate for repairing a detected defect. In either event, the manufacturing process 100 may then end for that fuel cell stack.

Many variations of the manufacturing process 100, as described with respect to FIG. 1 above, are possible. For instance, the order of acts in the process may be altered (e.g., it may be decided that a SOFC stack should be discarded before the stack cools to room temperature). As another example, additional or alternative manufacturing actions may be conditionally taken if defects are found in an SOFC stack. For instance, in embodiments in which rework of a fuel cell stack is not practical, in response to testing that indicates one or more defective fuel cells in the stack, the defective stack may be packaged for sale as a unit that may have degraded performance. As a specific example, the fuel cell stack may be altered such that one or more defective fuel cells in the stack are bypassed or rendered inoperative. Such a stack may perform, but at a reduced power output, and may be suitable for some uses. Alternatively, the fuel cell stack with a defective cell may be packaged for sale as a device that has a limited lifetime or reduced power output. Alternatively, a fuel cell may be removed from or disabled in a SOFC stack with an identified defect. Accordingly, it should be appreciated that FIG. 1 is illustrative and not limiting of the invention.

Figure 2:
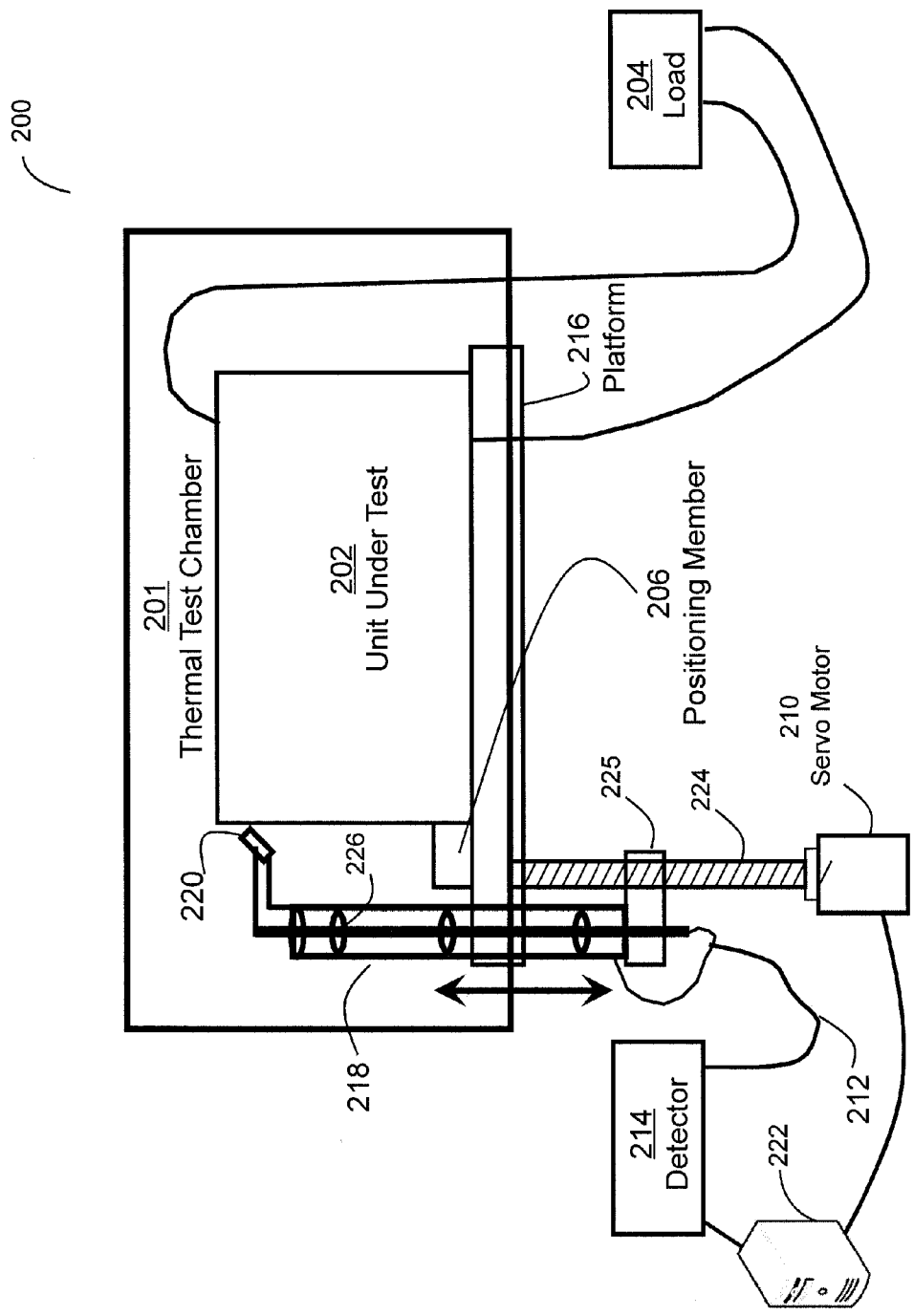
FIG. 2 is a functional block diagram of an illustrative test system configured to test a unit under test, in accordance with some embodiments of this disclosure.
Figure 3:
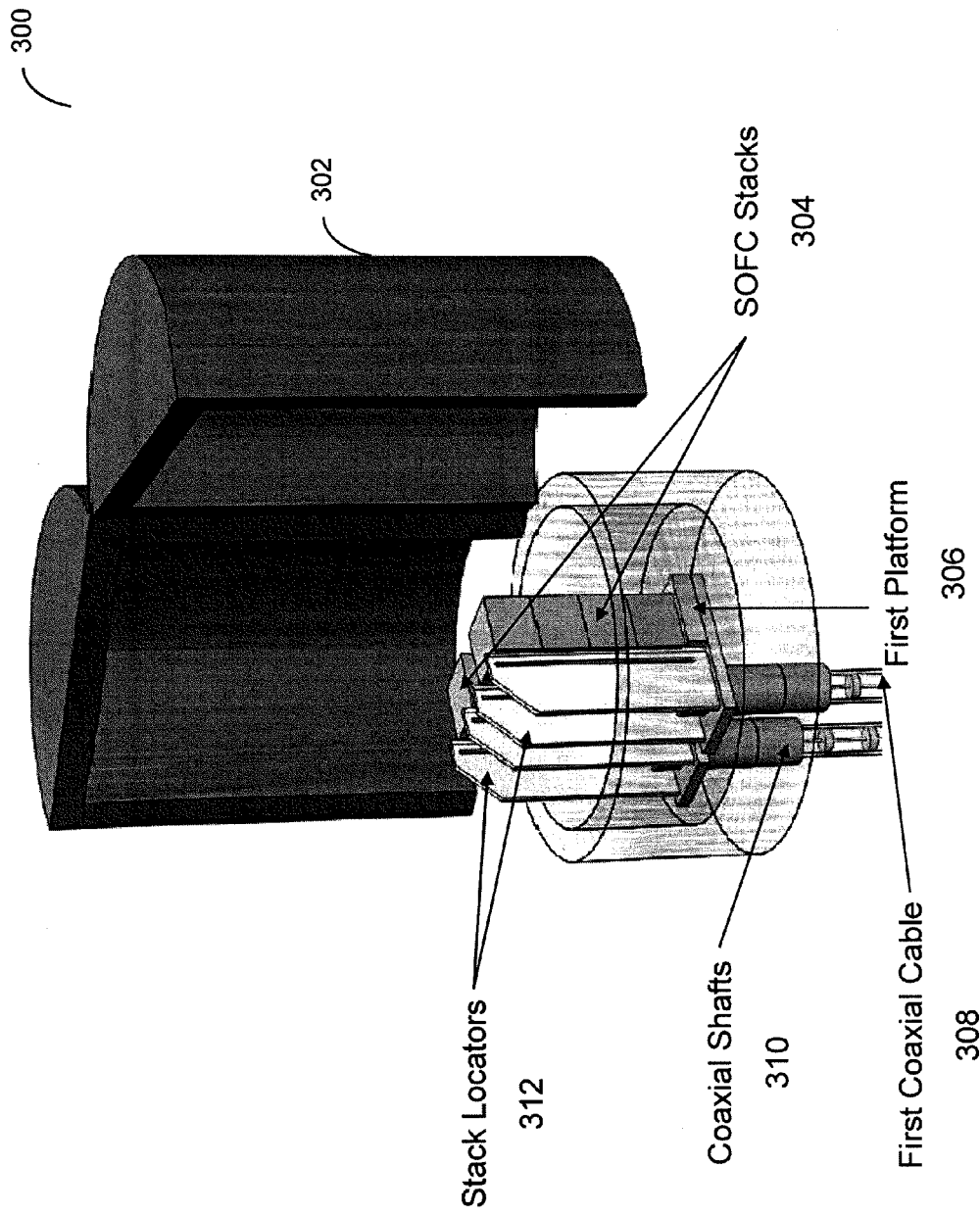
FIG. 3 is a sketch of components of an illustrative test system configured to test one or more units under test, in accordance with some embodiments of this disclosure.

The process of FIG. 1 may entail testing in any suitable test system. FIG. 2 depicts an illustrative test system 200 configured to test a unit under test 202. The unit under test may comprise one or more fuel cells and may, as shown in FIG. 3, comprise one or more fuel cell stacks. The fuel cell stacks may be solid oxide fuel cell stacks.

Test system 200 may include components that simulate an intended operating environment for unit 202 under test. For example, FIG. 2 illustrates a load 204. Load 204 may be implemented using one or more components that simulate a load experienced by unit 202 when operated. In embodiments in which unit 202 is a solid oxide fuel cell stack, load 204 may be components that establish an electrical load. Such a load may be constructed using techniques as are conventionally used in fuel cell testing or in any other suitable way.

The test system 200 includes a thermal test chamber 201 that may be temperature controlled to bring any object the chamber houses to any suitable testing temperature. In the embodiment illustrated, the thermal chamber is coupled to a source of heat and may be heated to any desired temperature above room temperature. Thermal test chamber 201 may be heated in any of numerous ways. For instance, the test system may include a furnace (not shown) configured to heat thermal test chamber 201 to the desired temperature. The furnace may heat chamber 201 by injecting heat into chamber 201. The desired thermal test chamber temperature may be any temperature suitable for operating unit 202. For example, if a unit being tested comprises a solid oxide fuel cell, the desired thermal temperature may be a temperature suitable for operating a solid oxide fuel cell, such as a temperature over 500 degrees Celsius.

Thermal test chamber 201 houses parts of test system 200 capable of operating at temperatures to which thermal chamber 201 may be heated. Other components of test system 200, including those that cannot withstand or do not operate reliably at those temperatures, may be located outside the thermal chamber. For example, FIG. 2 illustrates that load 204 is located outside of test chamber 201, being connected to unit 202 through high-temperature wires penetrating a wall of test chamber 201. Though, it should be appreciated that load 204 may alternatively be constructed of high temperature components, and be located within thermal test chamber 201.

One of the components housed within thermal test chamber 201 may be platform 216, which is adapted to hold unit 202. In the embodiment illustrated in which test system 200 is configured for testing SOFC's, platform 216 may be adapted to hold one or more SOFC stacks. Platform 216 may be of any shape suitable for holding the tested unit 202. For example, in embodiments in which the units to be tested comprise a generally flat surface, platform 216 may have a flat, rectangular supporting surface to support unit 202. Such a supporting surface may be a portion of a member made of a material that can withstand high temperatures, such as a refractory metal or a ceramic. Though, the specific material used to form platform 216 is not critical to the invention.

Platform 216 may include a positioning member 206. Positioning member 206 may include a surface or other feature that establishes a reference plane. That feature of positioning member 206 may be shaped to conform to a surface of unit 202. When that surface of unit 202 is pressed against positioning member 206, the surface of unit 202 is positioned in the reference plane. Such a configuration provides a mechanism to position a surface of unit 202 in a predetermined position such that measurements can be made reliably at one or more points along the surface with a non-contact measuring device.

To make such non-contact measurements, a non-contact probe may be positioned within thermal test chamber 201. In the illustrated embodiment, the measurements made are of voltages of along a surface of unit 202 and the non-contact probe is non-contact voltage probe 220. Non-contact voltage probe 220 may include one or more sensor heads and may generate signals that can be used in measuring a voltage of a surface that is adjacent to a sensor head. Exemplary sensor heads are further described below with reference to FIGS. 8a-8c and FIGS. 9a-9c.

Non-contact voltage probe 220 may be used to measure one or more voltages of unit 202 without coming into contact with unit 202. For instance, the voltage probe 220 may measure one or more voltages of the SOFC stacks.

Non-contact voltage probe 220 may be implemented using any suitable measurement technology. In the illustrated embodiment, non-contact voltage probe 220 may be a probe of an electrostatic voltmeter. An electrostatic voltmeter probe may be any of numerous types. For instance, such a probe may be a high-impedance passive probe. Alternatively, an electrostatic voltmeter probe may be an active probe that induces a measurable potential by using an oscillating component. In some embodiments, the probe may be adapted for operation in a high temperature environment by including an active cooling mechanism, such as a device that holds a flowing or evaporating cooling fluid. Though, in some embodiments a passive probe may not need to be actively cooled, whereas an active probe may need to be actively cooled because it has moving parts that are more susceptible to failure or inaccurate operation in a high-temperature environment.

The test system 200 may further comprise a motor, such as servo motor 210, that is coupled, directly or indirectly, between the non-contact voltage probe 220 and the platform 216. Servo motor 210 may be operated to provide relative motion between non-contact voltage probe 220 and platform 216. This motion may be in the reference plane defined by positioning member 206. In the embodiment illustrated in FIG. 2, servo motor 210 may be operated to slide non-contact voltage probe 220 in a direction parallel to the reference plane such that non-contact voltage probe 220 may scan across a surface of tested unit 202 that is held in the reference plane when unit 202 is positioned on platform 216. As shown, servo motor 210 is coupled to a threaded shaft 224. A member 225 with a complementary thread may be mounted to threaded shaft 224 and serve as a point of attachment for shaft 218, which in turn supports probe 220. With this configuration, rotation of motor 210 turns shaft 224, which in turns moves shaft 218 to drive probe 220. Though, in other embodiments, the servo motor may be operated to slide the platform 216 in a direction parallel to a surface of the non-contact voltage probe 220.

Regardless of whether servo motor 210 provides relative motion between voltage probe 220 and platform 216 by driving the voltage probe or the platform, the resultant relative motion induces relative motion between probe 220 and tested unit 202, which is held by platform 216. As a result, servo motor 220 may operate to provide relative motion between non-contact voltage probe 220 and unit 202, which may be one or more SOFC stacks.

The relative motion between voltage probe 220 and tested unit 202 enables the probe to unit 202, held on platform 216. For instance, the relative motion may position voltage probe 220, over time, adjacent to various locations on a surface of tested unit 202. Voltage probe 220 may obtain voltage measurements of tested unit 202 at each of these locations. Probe 220 may obtain any number of voltage measurements for every relative position between probe 220 and unit 202. For instance, probe 220 may obtain zero, one, or more voltage measurements corresponding to each position of probe 220 along a surface of tested unit 202. Such a sequence of measurements may then be analyzed to determine whether tested unit 202 is operating properly or is defective.

To facilitate relative movement of probe 220 and unit 202, test system 200 may include a slidable mount for non-contact voltage probe 220. The slidable mount may be configured to allow non-contact voltage probe 220 to slide relative to the platform 216. The slidable mount may further be configured to guide probe 220 in a direction parallel to a surface of unit 202 as it slides. In the embodiment illustrated in FIG. 2, probe 220 is mounted to shaft 218 that passes through an opening in a floor (not numbered) of test chamber 201. That opening may be sized to allow shaft 218 to slide through the opening, thereby creating the slidable mount. Though, and suitable number and configuration of bearings and other components may be used to create a slidable mount. The slidable mount and other mechanical components related to the sliding motion are further discussed below with reference to FIG. 4.

Test system 200 may further comprise detector 214 coupled to the non-contact voltage probe 220. The detector 214 may convert signals generated by probe voltage 220 into voltage measurements. These measurements may then be analyzed or otherwise used for testing a unit 202. Additionally or alternatively, the detector may deliver a visual representation of the measured voltages by using a display device. Any of numerous display devices may be used such as an LCD or an LED unit.

Detector 214 may be any suitable detector. For example it may be a commercially acquired detector, such as a detector manufactured by Trek or any other suitable detector manufacturing company.

In some embodiments, non-contact voltage probe 220 may be an electrostatic voltage probe and detector 214 combined with voltage probe 220 may form an electrostatic voltmeter. Such an electrostatic voltmeter may yield an instrument with a high effective input impedance (e.g., greater than $10^{15}$ Ohms) and/or a small shunt capacitance (e.g., less than $10^{-15}$ Farads).

Test system 200 may further comprise an interconnect unit that provides shielded electrical signal transport from non-contact voltage probe 220 to detector 214. The interconnect unit may include a conduit, such as shaft 218, at least a part of which is inside the thermal test chamber 201. A signal conductor, such as coaxial cable 212, may run through a bore of shaft 218. At least a part of coaxial cable 212 may be inside coaxial shaft 218. Coaxial cable 218 may electrically connect voltage probe 220 to detector 220.

In the embodiment illustrated, at least a portion of coaxial cable 212 may be formed of high temperature materials such that cable 212 may operate reliably within test chamber 201 when heated. Similarly, shaft 218 may be made of high temperature material such that a portion of the shaft may be inserted into test chamber 201.

The portion of shaft 218 extending from chamber 201 may be surrounded by insulation or otherwise packaged to preclude heat, conducted along shaft 218, from interfering with the operation of detector 214 or any other equipment outside test chamber 201. In some embodiments, the exposed end of shaft 218 may be coupled to an active cooling mechanism, such as a flowing or evaporating fluid, or any other suitable active cooling mechanism Coaxial cable 212 may be separated from the inside surface of shaft 218 to allow the cable to move within shaft 218 as probe 220 slides up and down. Any of numerous high-temperature insulating materials may be used to separate cable 212 from shaft 218. In the illustrated embodiment, for instance, ceramic beads 226 are used to hold cable 212 within shaft 218. Use of beads may provide for channels around cable 212 and in some embodiments, air or other cooling fluid may flow over cable 212 within shaft 218 to actively cool cable 212. Though, in other embodiments, cable 212 may be formed of a high temperature material that does not require any active cooling.

Test system 200 may further comprise a controller 222 for controlling the test process, including processing one or more voltages measured by non-contact voltage probe 220. Controller 222 may be any suitable device or combination of devices, including a microprocessor, microcontroller, process controller or general purpose computer.

Controller 222 may be programmed to process voltages measured by probe 220 to determine whether tested unit 202 contains a defect. For instance, controller 222 may perform computations on measured voltages to determine whether or not a defect exists in one or more solid oxide fuel cell stacks undergoing testing based on the measured voltages.

Controller 222 may be connected to detector 214 such that it may receive values indicating voltages measured by probe 220 from detector 214. Controller 222 may further control aspects of test system 200. For example, controller 222 may control operation of servo motor 210 to control, in turn, motion of the non-contact voltage probe 220. For instance, the controller may instruct motor 210 to move the probe based on a pre-specified set of motion parameters, such as locations to visit, order in which to visit them, velocities, accelerations, and the like.

All these values may be provided to the controller in any of numerous ways. For instance, they may be stored in a configuration file by a user, embedded in software instructions, or entered by a user through a user interface of the controller. Additionally or alternatively, controller 222 may dynamically determine any or all the above-mentioned motion parameters. For instance, the controller 222 may determine the motion parameters based on voltages measured by the non-contact voltage probe 220 and/or based on the temperature in the thermal test chamber 201.

Controller 222 may also control times at which voltages measured by probe 220 are recorded. By controlling both the position of probe 220 and timing of measurements, controller 222 may control test system 200 to produce a series of measurements corresponding to locations along a surface of a unit under test 202. Any suitable mechanism may be used to correlate measurement times with positions. For example, servo motor 210 may receive control inputs, which may be generated by controller 222, that causes servo motor 210 to rotate such that probe 220 is driven into a particular position. With probe 220 in a position set by controller 222, detector 214 may be controlled to provide an output, which is then correlated with the position of probe 220.

Though, it should be appreciated that any suitable mechanism to provide correlation between measurements and positions may be used. For example, probe 220 may be driven at a constant or otherwise known velocity. Detector 214 may be controlled to output samples representing voltage measurements at a constant or otherwise known rate, such that positions of measurements can be computed from the sample rate and rate of motion of probe 220. Though, it should also be appreciated that it is not a requirement that the position of each measurement be computed. In some embodiments, processing of measurements may be used to correlate measurements with structures on the unit 202 without determining specific locations of those structures. As a specific example, analysis of voltage measurements may correlate measurements with positions relative to fuel cells in a fuel cell stack.

Though a specific test system for testing a unit under test has been described with reference to FIG. 2, it should be recognized that the described system is illustrative and that many alternative embodiments are possible. As one example of an alternative system, the non-contact probe 220 may measure, instead of voltage, any of numerous electrical aspects of the unit under test. For instance, the probe may measure one or more of the following electrical quantities: current, resistance, conductance, reactance, flux, charge, magnetic field, electric field, and frequency. An example of another alternative is that a test system may include the mechanical components necessary to slide the platform 216 holding the unit under test. In this way relative motion between the probe 220 and the tested unit 202 may be obtained through motion of the probe 220 only, motion of the platform 216 only, or a combination thereof.

Furthermore, though only one non-contact probe, one platform, one coaxial shaft are shown in FIG. 2, the test system 200 may comprise one or more of any or all of these components. Similarly, the test system 200 may comprise one or more detectors, controllers, and servo motors. Such configurations may be advantageous to enable high-throughput testing of units such as solid oxide fuel cell stacks. One such configuration is discussed with reference to FIG. 3 below.

FIG. 3 illustrates components of an example test system 300 for testing one or more units under test. In this example, test system 300 is configured for testing multiple units under test. For instance, test system 300 may test multiple SOFC stacks. The illustrated portion is a thermal test chamber. The test system 300 may, in addition to the illustrated components, include components as described above in connection with test system 200 or may include different or additional components.

The thermal test chamber may have a surround 302, which may have thermally insulated walls that surround a thermal test chamber into which a unit under test may be placed. Surround 302 may be constructed of any suitable materials, including materials conventionally used for high temperature test systems.

Surround 302 may have any suitable shape. For instance, as shown in FIG. 3, surround 302 may have a cylindrical shape. However, surround 302 may have any other shape (e.g., box, cube) appropriate for enclosing the instrumentation that may need to operate at a high temperature. In the embodiment, surround 302 is constructed from three pieces that may be joined in any suitable way. FIG. 3 shows two semi-cylindrical portions, creating sides and a top of the test chamber, and a base portion, creating a floor of the test chamber. Though, it should be appreciated that any suitable number of components, joined in any suitable way, may be used to create a surround.

FIG. 3 illustrates that components of surround 302 may be separated such that an interior portion of the test chamber may be accessed, such as to load or remove units to be tested or to otherwise service the test system. It should be appreciated that any suitable mechanism may be included in surround 302 for access to the test chamber. For example, though not illustrated in the embodiment of FIG. 3, a door or other sealable opening may be formed in surround 302 to provide access to the test chamber.

The illustrative test system 300 is configured for testing multiple units, each of which may be an SOFC stack 304. The SOFC stacks may be configured in two parallel sets such that a first platform 306 may hold one set of SOFC stacks, and a second platform (not shown) may hold another set of SOFC stacks. It should be recognized that, in practice, a test system can be configured to test any number of SOFC stacks as part of a test sequence and that these of SOFC stacks may be positioned in any number of parallel sets; two sets of SOFC stacks are shown in FIG. 3 for clarity.

The SOFC stacks 304 on the first platform 306 may be arranged in any of numerous ways. For example, as shown in FIG. 3, the SOFC stacks may be placed on top of one another and the bottom surface of the bottom SOFC stack may be supported by first platform 306. Furthermore, a side-surface of each of the SOFC stacks may be adjacent to one of the stack locators 312. Many other arrangements are possible. For instance, multiple SOFC stacks may be placed alongside one another with each stack having a bottom surface supported by platform 306.

Regardless of the manner in which the units under test are positioned, test system 300 may include a non-contact probe for each set of units. Accordingly, a non-contact probe may be included for each platform configured to hold a set of units for testing. In the embodiment illustrated in FIG. 3, two non-contact probes may be included, one for each platform.

For example, a first non-contact voltage probe may measure voltages from the SOFC stacks arranged on the first platform 306, and a second non-contact voltage probe may measure voltages from the SOFC stacks arranged on the second platform. Alternatively, a single probe may have a range of motion (e.g., up/down and left/right) allowing it to scan multiple sets of SOFCs arbitrarily arranged on one or more platforms.

Regardless of the number of probes, one or more members may be included to position stacks relative to those probes. In the illustrated embodiment, stack locators 312 are shown. Each of the stack locators 312 may establish a reference plane for each of the SOFC stacks in an adjacent set, similar to the way that positioning member 206 (FIG. 2) establishes a reference place for a single unit 202. With this configuration, all of the SOFC stacks within a set may have a surface positioned in a single reference plane established by a corresponding stack locator 312. As a result, a single probe, moving linearly, may scan all of the surfaces of the stacks in a set. Though, it should be appreciated that a linear scanning motion is not required and, with different configurations of units for testing, different scanning motions may be used to scan the units of the set.

Regardless of the number of probes, and the manner in which they are configured to move, the test system 300 may comprise a mechanism to couple a signal from each probe to a detector and to support each one. In the example of FIG. 3, these mechanisms are provided by multiple coaxial cables and multiple shafts 310. The shafts, in addition to providing mechanical support for a probe, may provide electrical shielding for the coaxial cables. In some instances, there may be one shaft/cable corresponding to each probe, as shown in FIG. 3. In other instances, there may be multiple shafts/cables for a single platform or, alternatively, there may be a single shaft/cable for multiple platforms.

Each of the voltage probes may be connected to test system components outside surround 302 using one or more coaxial cables 308. For instance, a voltage probe configured to measure voltages from the SOFC stacks arranged on the first platform 306 may be connected to a detector, such as detector 214 (FIG. 2) using the first coaxial cable 308. Other coaxial cables may connect other probes to the same or a different detector. In embodiments in which a single detector is coupled to multiple probes, the probes may be connected through a multiplexing circuit or any other suitable mechanism to allow the detector to make measurements using each of the probes.

Figure 4:
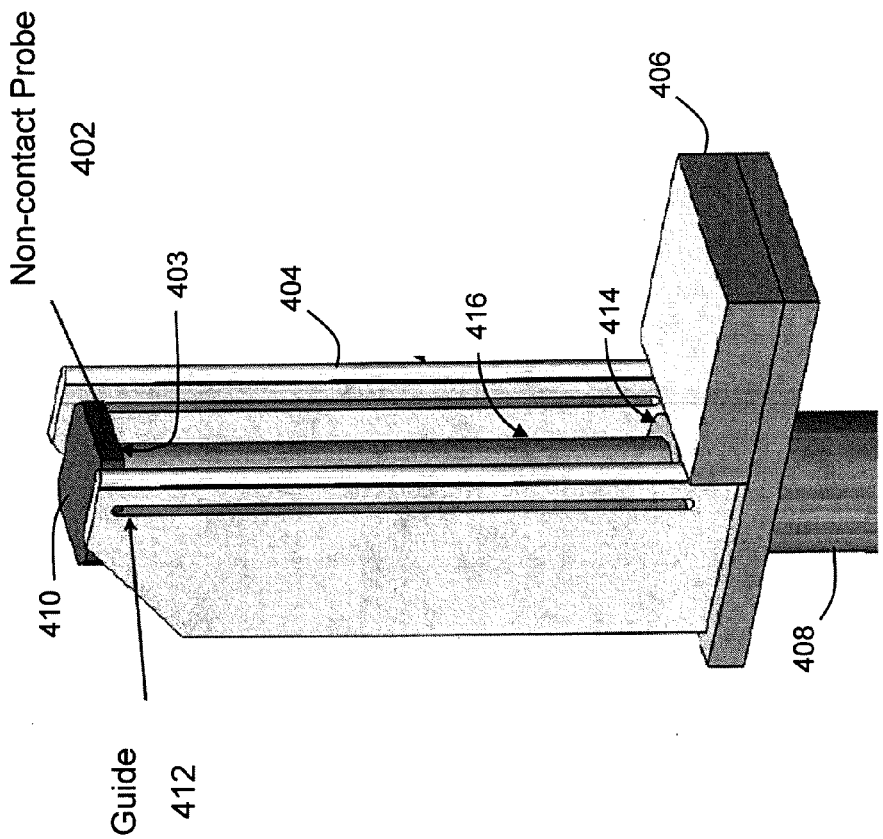
FIG. 4 is a sketch of components of an illustrative test system configured to test a unit under test, in accordance with some embodiments of this disclosure.

FIG. 4 shows, in greater, detail a platform and associated components of an illustrative test system. The illustrated components may be used with the test system 200 and/or the system 300, or a different test system. The illustrated components enable a non-contact probe 402 to move along a surface of one or more units situated on a platform 406. Each unit may comprise a solid oxide fuel cell stack. Though, the components may be used to test any suitable units.

For testing, the unit or units may be positioned with a side-surface of the tested unit or units adjacent to stack locator 404. Stack locator 404 may determine the horizontal spacing between the non-contact probe 402 and each unit. The horizontal distance between a forward, measurement edge of non-contact probe 402 and the unit under test may be any suitable distance and may depend on the characteristics of the non-contact probe 402 and the tested unit. In some embodiments in which probe 402 is an electrostatic voltmeter probe and the unit comprises solid oxide fuel cells, the horizontal distance between the measurement edge 403 of electrostatic voltmeter probe 402 and the SOFC stacks may be between 1 and 3 millimeters, for example. Moreover, stack locator 404 and platform 406 may be configured to ensure that the separation between probe 402 and the tested unit does not change more than a threshold amount as the non-contact probe moves. Positioning a surface of the units to be tested with stack locator 404 also promotes maintenance of uniform spacing as the shape of the unit under test changes, such as may occur as the shape of the SOFC stacks may change as a function of temperature inside the thermal test chamber.

Non-contact probe 402 may be attached to slidable mount 410. Slidable mount 410 may be configured to allow non-contact probe 402 to slide in a direction or directions that follows a contour of a surface of units under test along which measurements are to be made. In the illustrated embodiment, this direction is perpendicular to a surface of platform 406 on which a unit under test may be placed. In some embodiments, such as the one illustrated in FIG. 4, in which a surface of a unit under test to be scanned is positioned by a positioning component, such as stack locator 404, motion in the desired direction may be achieved by constraining motion in a direction defined by the positioning component.

In the embodiment of FIG. 4, stack locators 404 include a guide to constrain motion of probe 402 in a direction defined by stack locators 404. In this example, each guide is formed from a slot in the stack locator 404. The slot extends parallel to an edge of stack locator 404 used to position a unit under test. A projection, such as a pin or a roller, on probe 402 may extend into the slot. The projection is free to slide along the slot parallel to the positioning edge of stack locator 404, but constrained by the slot from moving in other directions. In this way, motion may be constrained in a desired direction may be permitted while the positioning of measurement edge 403 of probe 402 is controlled by the positioning of the slot of guide 412. In the embodiment illustrated, the slot has a uniform spacing relative to the positioning edge.

Slidable mount 410 may be implemented with any suitable components, including components as are known in the art. In the embodiment illustrated, slidable mount 410 is implemented with a coaxial shaft 408. Coaxial shaft 408 has an outer tubular member 414 and an inner tubular member 416. Outer tubular member 414 has a bore large enough to receive the inner tubular member 416 with sufficient clearance that inner tubular member 416 may slide relative to outer tubular member 414. Probe 402 may be attached to a first end of inner tubular member 416.

Though not expressly illustrated in FIG. 4, outer tubular member 414 may be fixed to a surround or other component of a test chamber containing the components illustrated in FIG. 4. A second end of inner tubular member 416 may be connected to a drive mechanism, such as motor 210 (FIG. 2). In this way, the drive mechanism may move the inner tubular member 416, which in turn drives the probe.

Figure 5:
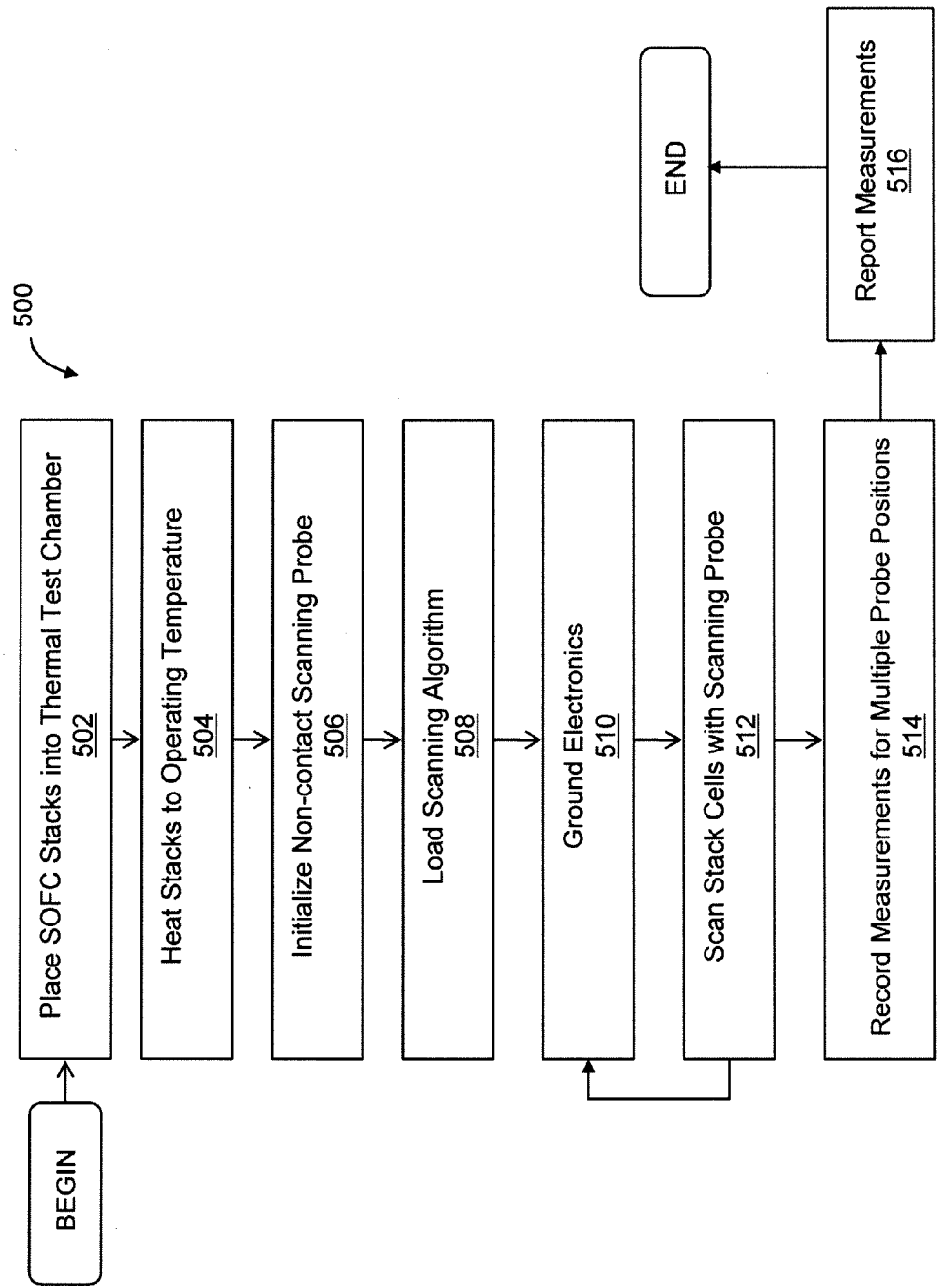
FIG. 5 is a flow chart of an illustrative scanning and measurement process using a scanning sensor, in accordance with some embodiments of this disclosure.

FIG. 5 shows an illustrative process 500 for scanning and measuring SOFC stacks with a non-contact probe. Process 500 may be performed as a portion of a process of testing the SOFC stacks.

In act 502, the SOFC stacks may be placed into a thermal test chamber. The thermal test chamber may be the chamber 201 shown in FIG. 2 or any other suitable chamber.

The SOFC stacks may be heated to an operating temperature, in act 504. The operating temperature may depend on the exact type of fuel cells being tested, but, generally, it may be any temperature over 500 degrees Celsius, such as 850 degrees Celsius. The SOFC stacks may be heated through the heating of the thermal test chamber. The thermal test chamber may be heated in any of numerous ways. For instance, a furnace may inject heat into the test chamber to heat the test chamber to a desired operating temperature.

Next, a non-contact scanning probe is initialized, in act 506. The non-contact scanning probe may be non-contact voltage probe 220 described with reference to FIG. 2 or may be any other scanning probe such as a non-contact probe capable of measuring another electrical aspect (e.g., current, flux, capacitance, conductance) of the SOFC stacks. The specific acts to initialize the probe may depend on the nature of the probe. Initialization may entail shorting components of the probe to ground or otherwise removing charge from the probe.

A scanning algorithm is loaded in act 508. The scanning algorithm may be executed by a controller (e.g., the controller 222 described with reference to FIG. 2) to direct the motion of the non-contact scanning probe as it scans the SOFC stacks. The scanning algorithm, when executed by a controller, may direct the scanning probe to move through a set of locations along a surface of each SOFC stack and collect measurements in any of numerous ways. It should be appreciated that the scanning algorithm may be loaded dynamically, such as by loading software into a computer system acting as a controller. Such an approach may be appropriate when a test system may be configured for testing any of a number of configurations of units under test and the scanning algorithm may be dynamically selected based on the specific units under test loaded into the test chamber. Though, it is not a requirement that the algorithm be loaded dynamically or that the loading occur after units for testing are placed in the test chamber. A fixed algorithm, for example, may be loaded in a controller at the time it is manufactured. Alternatively, an algorithm may be loaded when a test system is configured and subsequently used to test many batches of units.

The scanning algorithm may control the test system to perform any suitable actions. The scanning algorithm may control parameters of operation that include the speed at which the probe moves, the path over which the probe moves and/or the timing of measurements. For instance, the algorithm may direct the scanning probe to use a single mechanical scan that traverses a surface of every unit under test so as to collect all measurements in a single scan. In the case there is one SOFC stack, the single scan may comprise edge-to-edge scanning of the SOFC stack surface, proximate to a scanning surface of the probe, such that the probe takes measurements only as the probe moves from a first edge to a second edge of the surface. After the probe reaches the second edge, it may simply return to the first edge without taking any further measurements.

Though, in other embodiments, the system may continue to collect measurements as it returns to the first edge. Such a scan path may be useful, for example, when the probe is subject to drift over time. Though the measured voltages might be expected to be the same when the probe is positioned in the same location, regardless of whether that measurement is made while the probe is moving from the first edge to the second edge or from the second edge to the first edge. However, if drift occurs as the probe moves, these measurements will differ by the drift amount. Accordingly, taking multiple measurements of locations on the SOFC stack at different times may allow the amount of the drift to be identified through analysis of the collected measurements.

Another example relates to the SOFC configuration shown in FIG. 3, comprising multiple SOFC stacks. In this case, the non-contact probe associated with the first platform may move from the bottom edge of the bottom SOFC stack to the top edge of the top SOFC stack and, in the process, scan the series of SOFC stack surfaces adjacent to the stack locators 312. Once the probe reaches the top edge of the top SOFC stack it may stop taking measurements and may return to its starting position.

Alternatively, the scanning algorithm may direct the scanning probe to move and collect measurements using multiple scans. In this case, a probe may move along the surfaces it is scanning any number of times, and may (re)visit any locations along the surfaces in any suitable order. Such a scanning technique may allow multiple non-contact measurements to be taken at any location along the scanned surfaces of the SOFC stacks.

In some embodiments, the repeated measurements taken at the same location may be averaged, as a way to reduce measurement noise, for example. In other embodiments, the repeated measurements may be used to detect changes in the operating parameters of fuel cells over time, which, when such changes are large enough to exceed a threshold, may indicate a defect in a fuel cell under test.

In embodiments in which a probe is subject to drift, a drift compensation technique may be used when measurements taken over a relatively long period of time are taken. For example, drift may be measured under controlled conditions and the rate of drift may be stored. As measurements are taken over time, the rate of drift, multiplied by the time interval over which measurements were taken, may be used to compute a drift correction factor that may be applied to measurements. Though, other embodiments may not require such drift compensation if a set of measurements is taken over a period of time that is short in comparison to the drift rate.

The scanning and measurement process 500 continues in act 510 during which the scanning probe may be positioned to measure a reference potential, which may be regarded as a ground whether or not connected to an earth ground. A reference measurement may be made with the probe in this position. In the system of FIG. 4, for example, the lowest surface of an SOFC fuel cell stack may be at a reference potential. Accordingly, the reference measurement may be made by moving probe 402 to a position above platform 406, where the lowest surface of an SOFC may rest. Though, in embodiments in which platform 406 is conductive, the platform may be at the reference potential such that a reference measurement may be made with the probe adjacent any portion of platform 406. Subsequent measurements may be made relative to this reference potential.

Next, in act 512, the scanning probe scans the SOFC stacks and obtains one or more measurements corresponding to each probe location along the scanned surfaces of the SOFC stacks. The scanning algorithm may direct the probe to follow a path and take measurements in accordance with scanning algorithm loaded in act 508. Accordingly, the measurements may be made of one scan or multiple scans along a surface of one or multiple units.

In some scan algorithms, a reference potential may be measured at one or more times during the scanning. Accordingly, at any suitable time in the scanning process, process 500 may loop back to act 510 where a further reference measurement is made. For instance, the reference measurement may be repeated after a certain time period elapses, a certain number of measurements are taken, and/or at least a certain voltage potential is measured by the probe.

Measurements made as the probe is scanning may be recorded in act 514. The measurements may be recorded along with corresponding probe positions at which they were taken. The measurements may be recorded by any device that may record measurements. For instance detector 214 and/or by controller 222, described with reference to FIG. 2, may be used to record measurements. Additionally, the recorded measurements may be stored in a computer memory coupled to the detector 214 and/or the controller 222, or stored in any suitable electronic file storage, such as a text file or a database.

Figure 6:
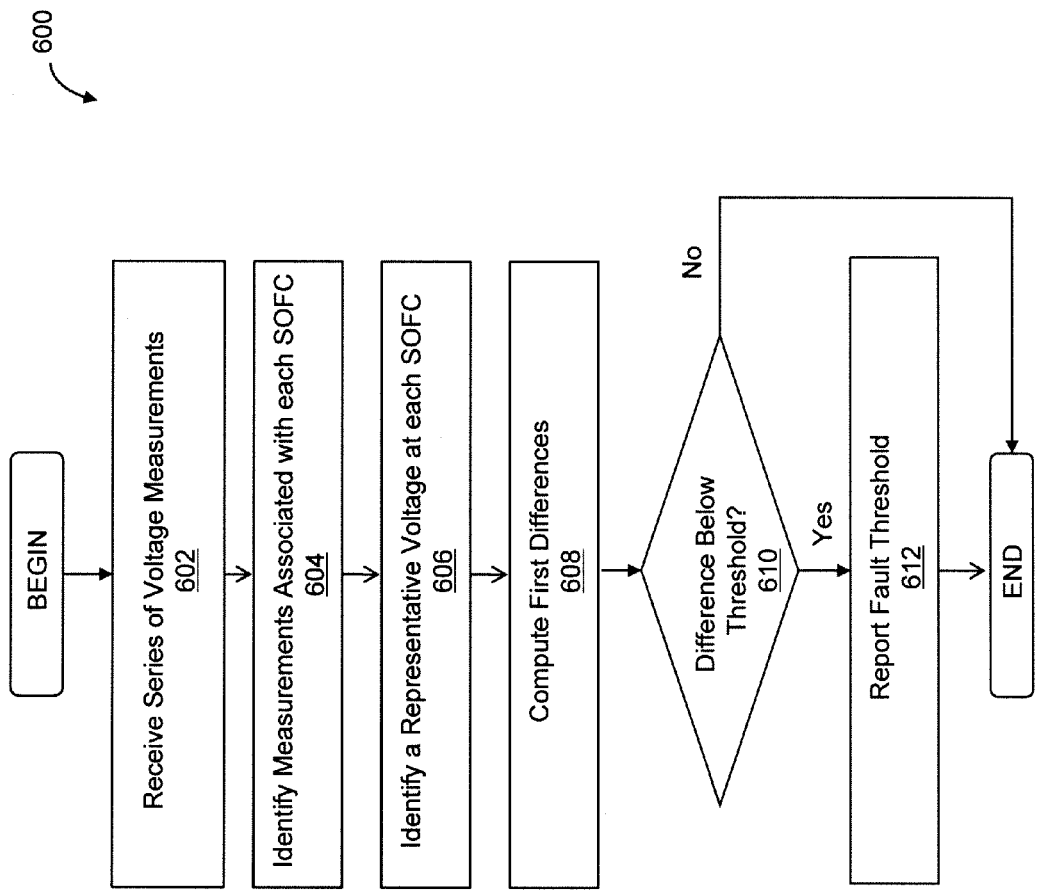
FIG. 6 is a flow chart of an illustrative process for analyzing measurements of a fuel cell stack obtained by a scanning sensor, in accordance with some embodiments of this disclosure.

The measurements may be reported, in act 516. They may be reported to a user through a display device, such as the display device part of the detector 214, or through any user interface associated with the controller 222 such as monitor, screen, or a printer. Additionally or alternatively, they may be used for further processing to determine whether or not the scanned SOFC stacks contain any defects, such as is illustrated in FIG. 6. Regardless of how the measurements are reported, after the obtained measurements are reported, process 500 ends.

The scanning and measurement process 500 is illustrative and may be modified in any of numerous ways. For instance, the process 500 may be adapted to scan not only SOFC stacks, but also any suitable unit under test such as a semiconductor. Moreover, the described scanning techniques may be adapted to a test system using multiple scanning probes. All such modifications and alterations are within the spirit of the present disclosure.

Techniques for processing reported measurements obtained by a non-contact scanning probe to determine whether scanned SOFCs contain defects are now described with reference to FIG. 6 and FIGS. 7a-7c. This processing may be performed within a controller, such as controller 222, that is part of a test system acquiring measurements or may be performed by any suitable computing device that may receive measurements.

FIG. 6 depicts an illustrative process for analyzing measurements of a solid oxide fuel cell stack obtained by a scanning sensor to identify faulty fuel cells. The process begins by receiving a series of voltage measurements in act 602. These measurements may be those reported in act 516, though the measurements may be obtained in any suitable way. It should be recognized that the measurements are not restricted to being voltage measurements, and could be of any type including current, resistance, and conductance measurements, among others.

The measurements may be processed to identify which voltage measurements are associated with each fuel cell in the SOFC stack, in act 604. The voltage measurements may be divided into groups and each group may be associated with a fuel cell in the fuel cell stack. In some embodiments, the voltage associated with each fuel cell may be determined based on the positions at which voltage measurements were made relative to known positions of fuel cells.

In other embodiments, the positions of the probe at the time that measurements were taken and/or the positions of the fuel cells being measured may not be known precisely. In such a scenario, the measurements representing individual fuel cells may be identified from computations performed on the measurements. As an example of such a computation, the voltage measurements may be divided into groups based on patterns identified in the voltage measurements. For instance, voltage measurements may be clustered based on the closeness of their values—closer-valued measurements may be grouped together. Another approach may be to look for regions in which the voltage measurements are not changing (e.g., a plateau in which measurements may be fluctuating about a value) and group the measurements in each such region together.

In some embodiments, when the voltage measurements of an SOFC stack are obtained using the single pass technique (previously described with respect to FIG. 5), the voltage potential sensed by the probe may start at 0 Volts when the scanning probe is adjacent a surface establishing the reference potential and increase as the scanning probe scans along a surface of the SOFC stack. The measured voltage potentials may fluctuate slightly from one measurement to the next as a result of measurement noise or other factors as the scanning probe remains in the vicinity of a particular fuel cell in the stack; such fluctuations may have an average size. However, as the probe continues to scan the fuel cell stack and scans past the particular fuel cell on to another fuel cell in the stack, the amount by which the measured voltage increases may be greater than the size of the average fluctuation. Such increases may be used to identify measurements associated with each solid oxide fuel cell.

Figure 7A:
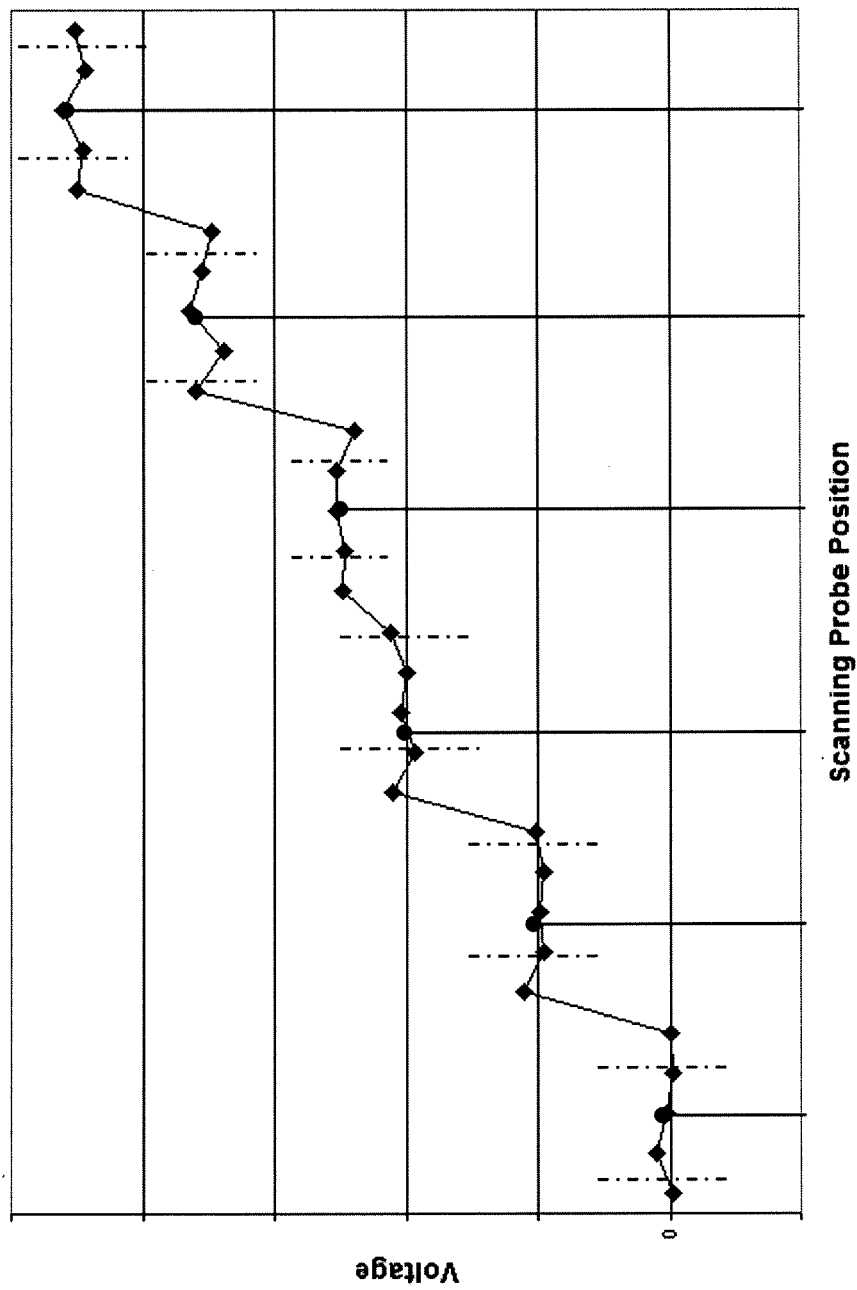
FIG. 7a, FIG. 7b, and FIG. 7c are graphs illustrating a process for analyzing voltages measured by a scanning sensor, in accordance with some embodiments of this disclosure.

This technique is illustrated graphically in FIG. 7a, which depicts an example set of voltage measurements collected by a non-contact scanning probe. The voltages are plotted as a function of the position of the scanning probe. In this example, the first five voltage measurements are distributed about 0 Volts and may correspond to a position of the probe next to a reference structure.

As the scanning probe moves away from the reference structure and scans a surface of the fuel cell stack, the voltage potential may increase. As shown in FIG. 7a, the measured voltages may increase in a staircase-like manner: the voltages may go through discrete step-like increases and fluctuate about fixed values (plateaus) between such increases. In this example, there are six plateaus including the first plateau, which may correspond to the ground position of the probe.

Measurements in each of the plateaus, excluding the first, may be grouped together and identified with five serially-connected fuel cells. In practice, measurements may be grouped using any appropriate data processing methods that may comprise finding plateaus in the measurements and grouping the measurements in each plateau together. Any of numerous other techniques may be employed such as clustering methods, statistical techniques, and rule-based methods. Moreover, these techniques may be used in connection with heuristics or other techniques that take advantage of information about the test system or unit under test. For example, an approximate thickness of a fuel cell may be known such that a clustering algorithm preferentially groups measurements of similar values into clusters that have center-to-center spacing approximately equal to the thickness of a fuel cell or an integer multiple of the fuel cell thickness.

Regardless of the manner in which measurements associated with fuel cells are identified, a voltage representative of each fuel cell in the SOFC stack may be identified in act 606 of the process 600. The voltage representative of a specific fuel cell may depend on the measurements associated with that fuel cell in act 604. For instance, the representative voltage may be one of the voltage measurements associated with the specific fuel cell. Alternatively, the representative voltage may be a function of the voltage measurements associated with the specific fuel cell. The function may compute the mean, median, mode, minimum, or maximum of the voltage measurements associated with the fuel cell. Though, other possibilities will be apparent to those skilled in the art. For instance, the representative voltage may depend on all voltage measurements and may be computed as a weighted average of voltages, where the weighting may be a function of the probe position with weights selected to preferentially weight measurements at a center of a cluster or selected in any other suitable way. In embodiments in which multiple scans are made over a unit under test, the function may combine measurements, with or without correction for drift, made in multiple scans.

Figure 7B:
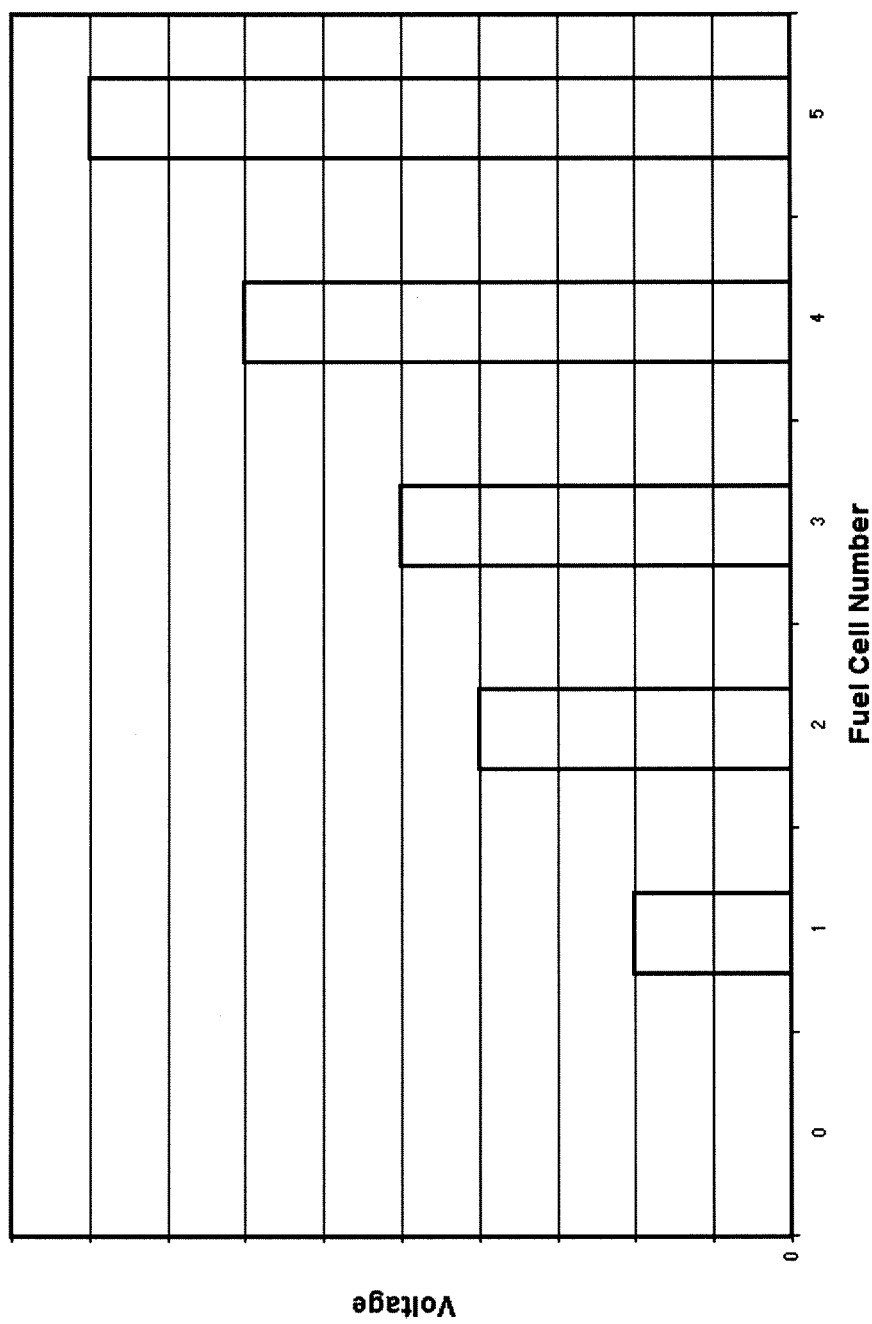

FIG. 7b shows a bar graph of the representative voltages corresponding to the above-mentioned example described with respect to FIG. 7a. In this example, the voltages associated with each of the five plateaus were averaged to yield a representative voltage for each plateau. Each representative voltage corresponds to a bar in the bar graph. Furthermore, as shown, each of these representative voltages may be associated with a fuel cell. In the illustrated example, this association is made based upon recognizing plateau patterns in the voltage measurements. Though, generally, other information may be used such as information about the expected thickness and voltage output of a fuel cell.

Figure 7C:
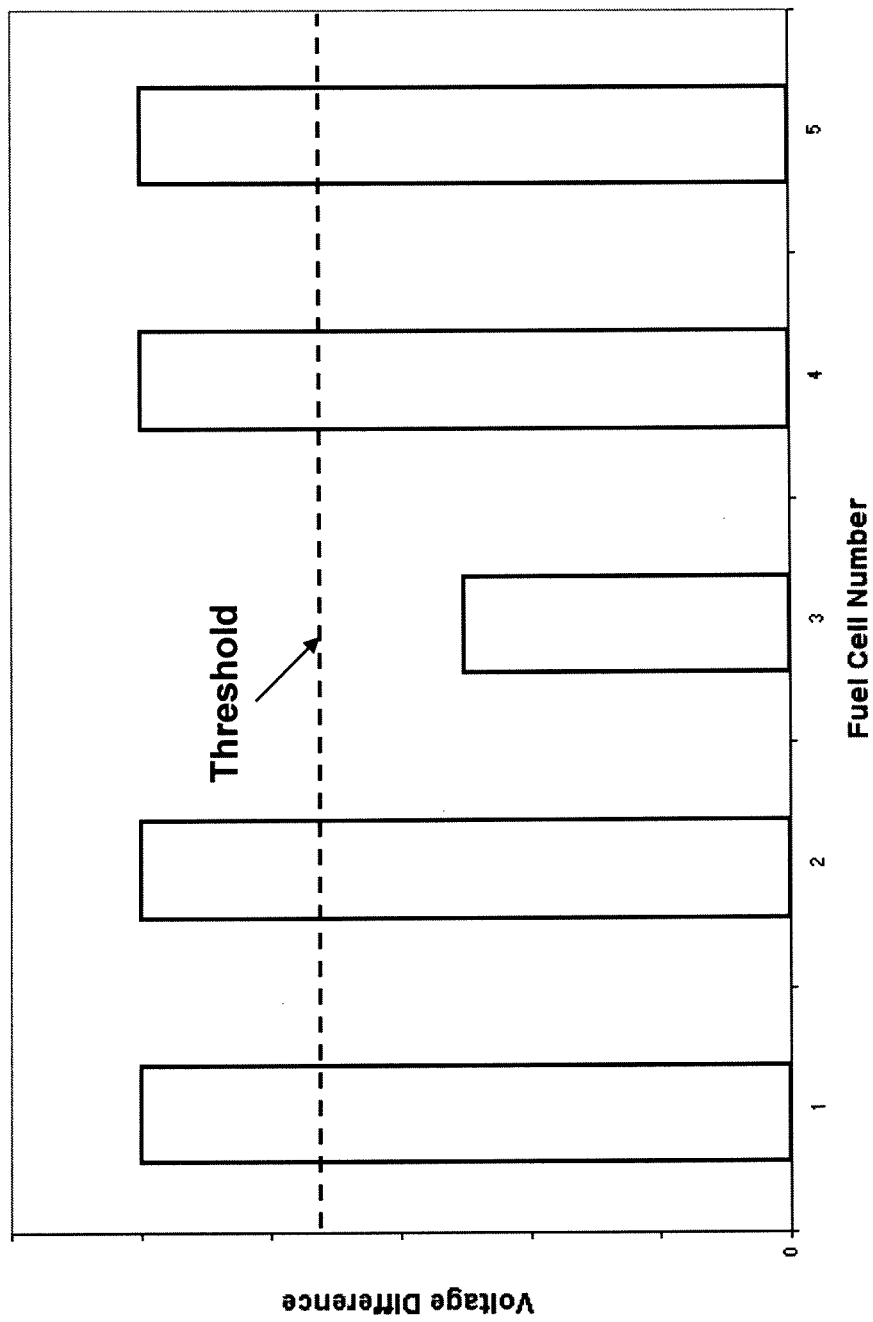

First differences between the representative voltages may be computed in act 608. First differences may be computed between representative voltages corresponding to adjacent fuel cells. For instance, FIG. 7c illustrates computed first differences between representative voltages associated with the first and second, the second and third, the third and fourth, and the fourth and fifth fuel cells.

In act 610, the computed first differences may be compared to one or more thresholds to determine whether any of the differences lie outside of a range. The range may be predetermined or may be dynamically determined based, for example, on the obtained voltage measurements. In some embodiments, checking whether any first differences lie outside of a range may comprise checking whether any of the first differences lie below a threshold amount. This type of check may be used to identify if a measured voltage potential did not increase over the threshold amount. The threshold amount may be determined in any of numerous ways. For example, the threshold amount may be determined in advance based on an expected voltage output of each fuel cell. If the voltage difference from cell to cell does not exceed a minimum acceptable voltage output for a fuel cell, a faulty fuel cell may be indicated. Though, in other embodiments, the threshold amount may depend on the standard deviation of a subset of representative voltages or it may be set prior to any voltages being measured based on user expectations. In other embodiments, checking whether first differences lie outside of a range may comprise checking whether any of the first differences lie above a second threshold amount.

If a first difference between a representative voltage of a first cell and a representative voltage of a second cell is computed and found to lie outside of a range, then either the first fuel cell, the second fuel cell, or both may be determined to be defective. For example, if a first difference is found to lie below a threshold, then this first difference may be reported, together with the threshold and the identified defective fuel cells, in act 612 of the process 600.

In the example shown in FIG. 7c, the difference in the voltages representative of the third cell and the second cell lies below a threshold, which is indicated by a dashed line. This may indicate that the voltage potential measured by the non-contact probe did not sufficiently increase (i.e., by an amount exceeding the threshold amount) as the probe scanned past the third fuel cell. Consequently, this condition may indicate the third fuel cell may be defective.

If none of the first differences, computed in act 608, lies outside of a range, then no defects may be identified in the fuel cell stack. After all first differences have been computed and checked to see whether they lie outside of a range, with any first differences lying outside of a range reported, the process 600 completes.

It should be appreciated that other acts may alternatively or additionally be included in processes 500 and/or 600. In some instances, a drift may be present in the voltage measurements obtained by the non-contact probe. The drift may be linear or be well-modeled by a higher-order polynomial. To account for this drift, an act may be introduced into the process 600, to estimate this drift and remove it from the voltage measurements before subsequent processing. The drift may be removed at any point in the processing. For instance it may be removed from all the measured voltages or from the representative voltages.

The drift may be estimated using any of numerous techniques. In some embodiments, the probe may scan the SOFC stack by moving at a constant velocity. Subsequently, a linear-least-squares fit to the measured voltage may be computed and used to estimate the drift. Still other techniques for estimating drift will be apparent to those skilled in the art. Though, if the drift that accumulates during the scanning time is negligible, acts of drift compensation may be omitted.

The process 600 for analyzing measurements of a solid oxide fuel cell stack obtained by a scanning sensor is illustrative and may be modified in any of numerous ways. For instance, the process may be modified to analyze voltage measurements obtained from multiple fuel cell stacks (e.g., such as the arrangement of SOFC stacks shown in FIG. 3). Also, the process may be adapted to process measurements obtained by the probe using any scanning techniques (e.g., a multiple scan technique in which the probe may repeatedly visit a location).

Alternative approaches to analyzing the voltage measurements and their fluctuations from one position to another may be employed. For example, different methods for identifying a representative voltage at each fuel cell may be used, potentially including methods based on curve fitting, regression analysis and/or hypothesis testing. Quantities other than first differences of representative voltages may be obtained to identify potentially defective fuel cells. For instance, higher-order approximations to the first derivative and/or interpolation methods may be used. Additionally, or alternatively, pattern recognition methods comprising classifiers, neural networks, wavelets etc., may be employed to determine whether a series of voltage measurements corresponds to a faulty fuel cell stack and/or a properly functioning stack or other type of unit under test.

Figure 8A:
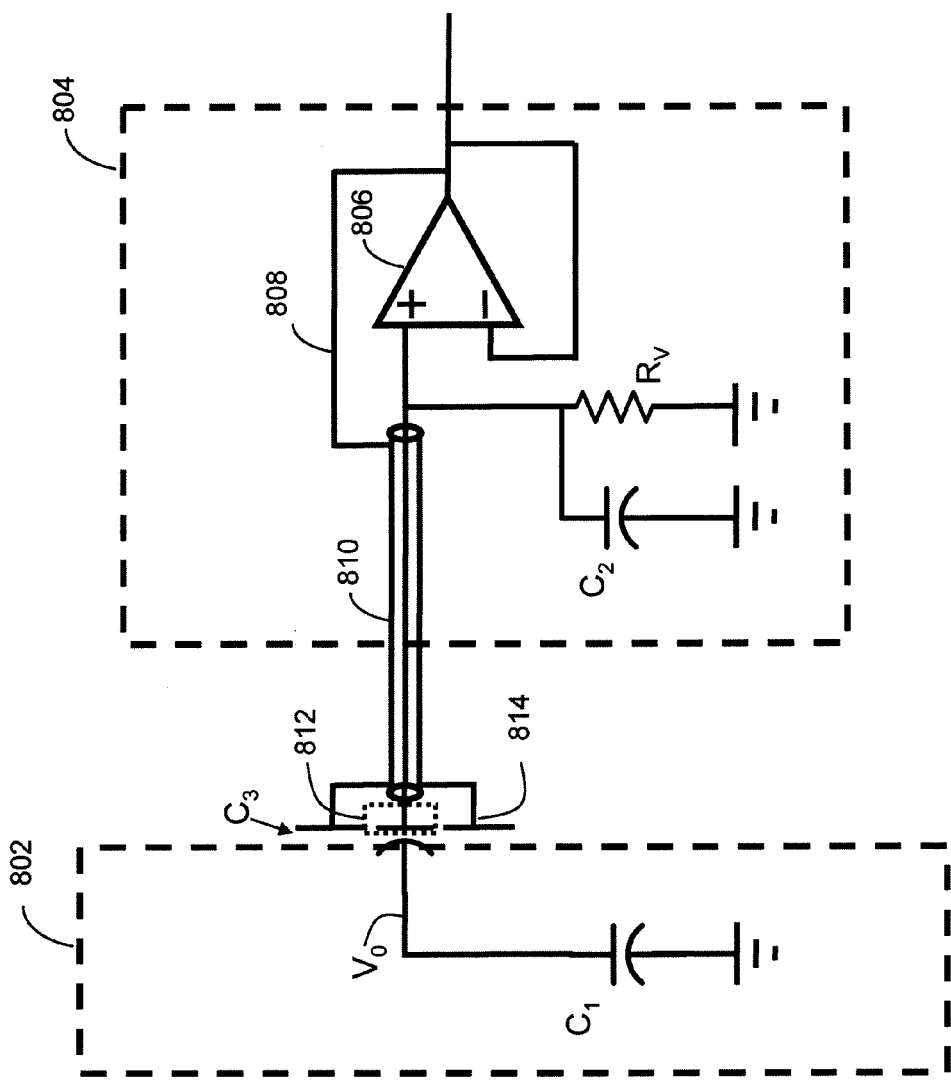
FIG. 8a is a schematic of an electrostatic voltmeter for obtaining non-contact voltage measurements, in accordance with some embodiments of this disclosure.

A non-contact voltage probe, such as the voltage probe 220 shown in FIG. 2, may comprise a sensor head made according to any suitable techniques. FIG. 8a is a functional block diagram schematically illustrating operation of a sensor head 814, which is connected to a detector 804 to form an electrostatic voltmeter. Sensor head 814 and detector 804 may be operated to obtain non-contact voltage measurements of the unit under test 802. The unit under test may comprise a solid oxide fuel cell stack and the electrostatic voltmeter may be used to obtain non-contact voltage measurements of at a location along a surface of the SOFC stack. Though, it should be appreciated that the nature of the unit under test is not critical to the invention and the testing techniques described herein may be applied to test other types of units.

The sensor head 814 may comprise a conducting sensor element 812 generally surrounded by other conductors acting as a Faraday cage. The surrounding conductive members may be shaped to leave only a portion of the central conducting element exposed in a measurement edge of the probe. As shown, that exposed edge may face the unit under test 802.

In order for the voltmeter to accurately measure a particular voltage potential at a location along a surface of the fuel cell stack, the voltmeter preferably provides a high-impedance to the unit under test 802. The sensor head may be coupled to electrostatic detector 804, and detector 804 may include one or more operational amplifiers, connected with a feedback path 808 to provide a high input impedance of at sensor head.

In operation, as the sensing edge of the sensor element is brought near a surface that has a potential, modeled by a voltage $V_0$ on a capacitor $C_1$, electrostatic fields will couple to the edge of the sensor element. This coupling is modeled by capacitor $C_3$. The sensor element, as shown, may be connected to a capacitor $C_2$ within detector 804. As a result of the electric field on the sensor element, a measurable voltage is created at the input of amplifier 808, which will then produce an output representative of the measured voltage $V_0$.

In this example, the resistance $R_V$ at the input of amplifier 806 is relatively large such that the time constant $C_3 R_V$ is long relative to a time required to take a measurement. The capacitance of capacitor $C_2$ is a small parasitic input capacitance and the resistance $R_V$ is a large parasitic input resistance. Ideally the capacitance $C_2$ and the resistance $R_V$ would approach the values of 0 and infinity, as in an open circuit.

Though the voltage on capacitor $C_2$ may be relatively small, an accurate measurement may nonetheless be made. To provide a desirable signal to noise ratio, shielding may be used over substantial portions of the signal path between detector 804 and the measurement edge of sensor head 814. Alternatively or additionally, active guarding may be used around all or portions of the signal path. Here, an active guard 810 is shown. Active guard 810 is formed by conducting structures that surround substantial portions of the signal path over substantial portions of the length of the signal path, including, in the embodiment illustrated, within the sensor head 814. The active guard 810 may be actively driven based on the output 808 from the amplifier 806 such that active guard 810 is at a potential that matches the potential of the sensor element.

Sensor head 814 may be passive and may contain metal conductors and insulators. These materials for example, may be refractories, such as high temperature materials, including, for example, nickel content alloys such as Inconel®, Hastelloy®, Monel®, Haynes®, Incoloy®, or insulators such as mica or ceramic material. Any suitable ceramic materials such as Alumina, Cordierite, grade "A" lava, MACOR® Glass, and Mullite may be used. Still other examples include Sapphire, Silicon Carbide, Silicon Nitride, Steatite, Zirconia, Zirconia oxide, and Zirconia-toughened Alumina. In some embodiments, sensor head 814 may contain no electronic components. Sensor head 814 may be able measure voltage to within an accuracy of 50 milliVolts, and may have a dynamic range of ±50 Volts. Furthermore, sensor head 814 may have a low thermal mass and, as a result, may maintain thermal uniformity in a thermal test chamber, such as the thermal test chamber 201 shown in FIG. 2. Low thermal mass, for example, may be provided by having a relatively thin portion of the sensor head in close proximity to the unit under test.

Sensor head 814 may be of any of numerous types and may have any of a variety of geometries and sizes, which may be selected for a specific sensing application. For instance, sensor head 814 may be a cylinder, a cube, a box or have any other suitable three-dimensional shape. In other embodiments, the sensor head may be substantially cylindrical, substantially cubical or substantially box-like.

Figure 8B:
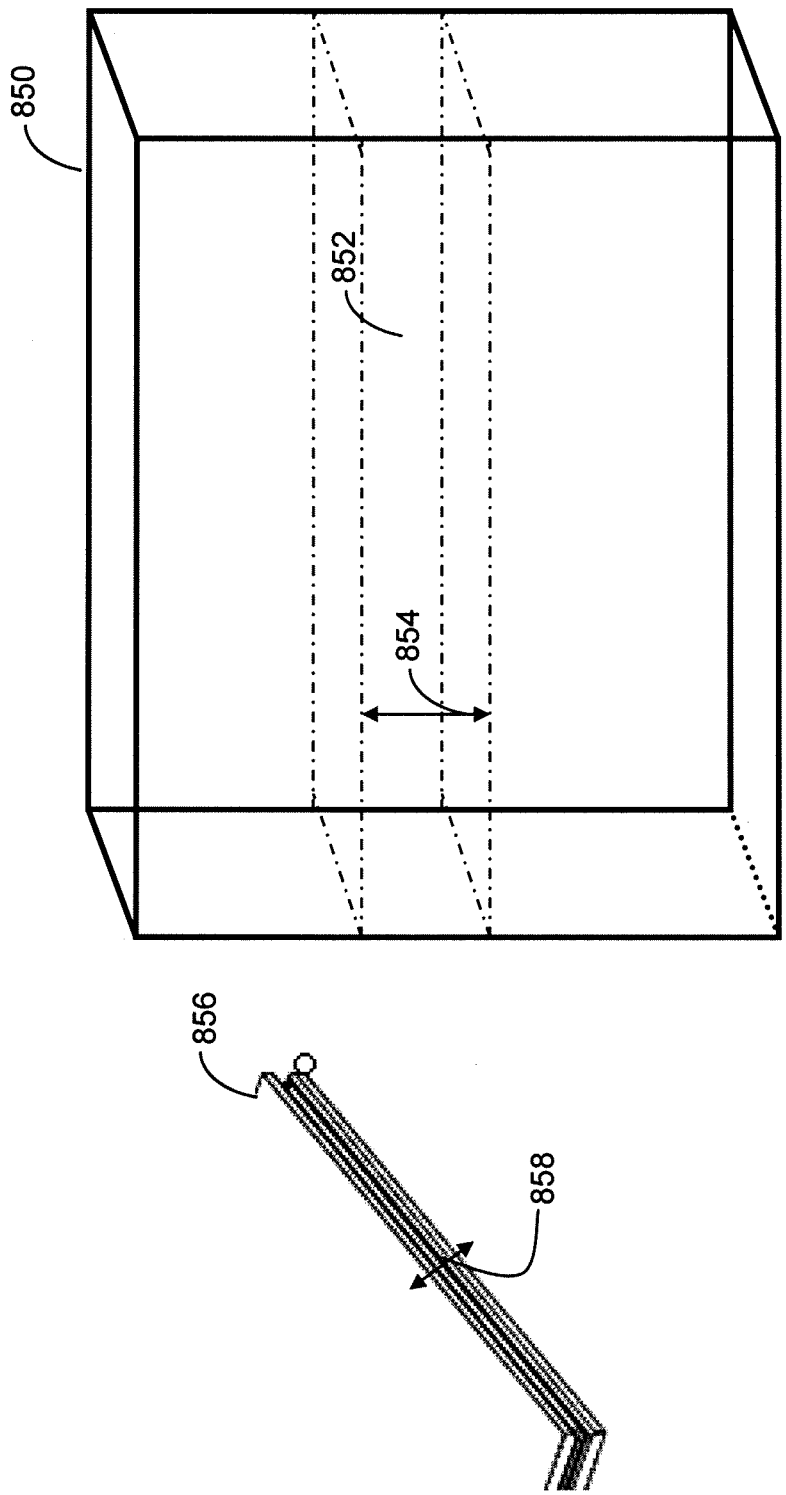
FIG. 8b is a sketch of a side view of a sensor element and a fuel cell in a fuel cell stack, in accordance with some embodiments of this disclosure.

In some embodiments, a sensor element illustrated in FIG. 8a, may have a thickness that is smaller than the height of the surface over which a measurement is made. A sketch of a side view of a sensor element 856 is shown in FIG. 8b. Sensor element 856 is a generic sensor element and may be the same as the sensor element 812 or any other sensor element discussed herein. The thickness 858 of sensor element 856 is also indicated.

FIG. 8b also shows a sketch of a solid oxide fuel cell stack 850. SOFC stack 850 comprises a SOFC cell 852, which has height 854. To reduce interference from neighboring cells and improve resolution, the thickness of the sensor element may be smaller than the height of each fuel cell measured. For example, in the illustrated embodiment, the thickness of the sensor element 856 may be smaller than the height of fuel cell 852. Though, in other embodiments the thickness of the sensor element may be greater than or equal to the height of a fuel cell in the fuel cell stack and interference from neighboring fuel cells may be accounted for in subsequent data processing steps.

Measurement accuracy may be increased by having substantial portions of the measurement edge of the sensor head facing the unit under test. In some embodiments, sensor head 814 may have a width that is at least 50% of the width of the surface over which a measurement may be made. In some embodiments, the width of the sensor head may be greater than 75% of the width of a unit under test, such as a fuel cell stack. In yet other embodiments, the sensor head may have a width that approximates the width of the surface over which a measurement may be made. Accordingly, the sensor head may comprise a thin, flat rectangular assembly as illustrated in FIGS. 9a-9c.

Figure 9A:
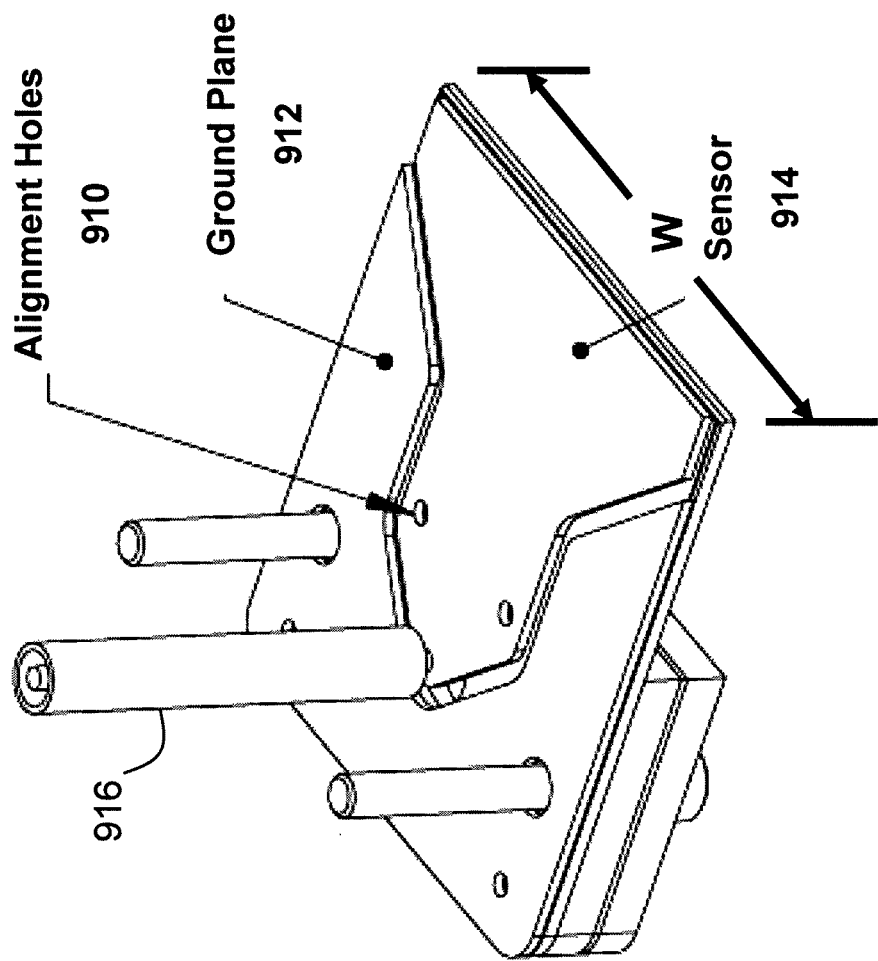
FIG. 9a is a sketch of an illustrative flat, rectangular sensor element, in accordance with some embodiments of this disclosure.

FIG. 9a shows a view of a bottom portion of this type of sensor head comprising a ground plane 912, and a sensor 914. Alignment holes 910 may extend through separate layers that form sensor 914 to align those layers as illustrated. The width of sensor 914 may approximate the width of the surface being measured. This may allow the sensor to maximize sensitivity to voltage potentials on the surface being measured.

In the view illustrated, inner member 916 of a coaxial shaft is shown attached to the sensor head. A central conductor, which may be a shielded, high-temperature cable runs through a hollow interior portion of the inner member and may be attached to a sensor element (e.g., element 930 FIG. 9c). The high-temperature cable may, for instance, be coaxial cable 218 discussed with reference to FIG. 2. In some embodiments, the high-temperature cable may exhibit low triboelectric charge characteristics to eliminate any voltage due to triboelectric charge from being measured by the sensor head. Triboelectric charge may result from flexure of the high-temperature cable, whereby one material moves against another material and this motion generates an unwanted charge.

Figure 9B:
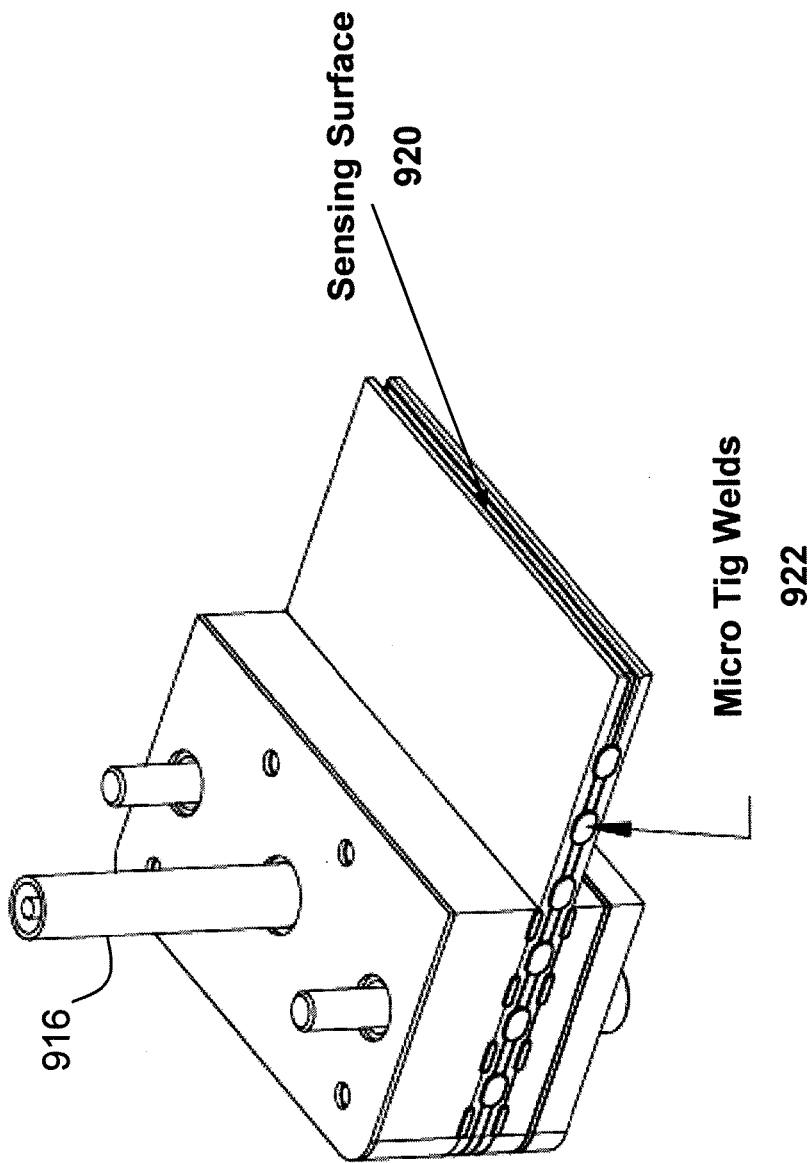
FIG. 9b is a sketch of an alternative embodiment of a flat rectangular sensor element, in accordance with some embodiments of this disclosure.
Figure 9C:
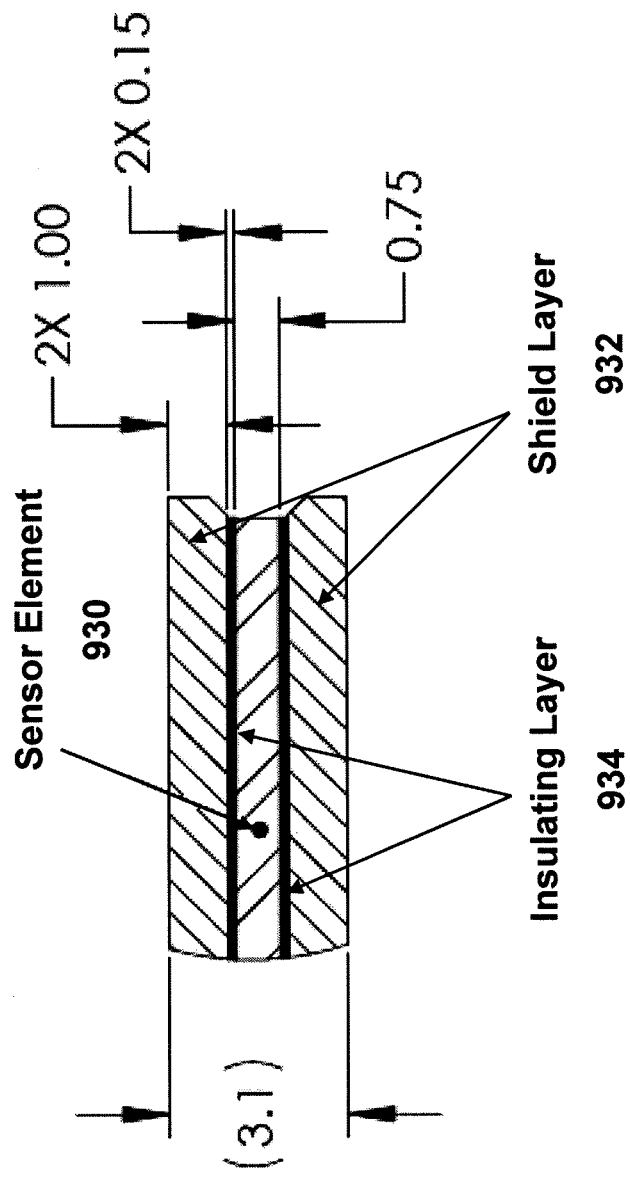

FIG. 9b shows an alternative embodiment of a sensor head comprising a flat, rectangular sensor element. In some embodiments, the sensor element may be surrounded on multiple sides with a conductive structure that acts as a shield. The sensor element may be exposed in one surface that is not covered by the shield members. In some embodiments, the sensor element may be surrounded on five sides by interconnected conductive members, leaving an edge of the sensor element exposed in a sixth side.

It should be appreciated that the conductive members forming the shield need not fully cover each side of the sensor element. For example, one or more sides of the sensor element may be shielded by conductive structures having openings therein or may be formed of a plurality of conductive members that have openings between them.

In the embodiment illustrated, the sensor head includes a top shield layer and bottom shield layer. These shield layers may be electrically connected together to form a Faraday cage above and below a sensor element. The upper shield layer and lower shield layer are welded together using micro tig welds (922), though other conventional welding techniques may be employed or any other suitable technique to form an electrically conductive connection between the shield layers may be used. For instance, a thin strip of metal may be welded to both top and bottom shield layers. Micro tig welds 922, because they are connected to the shield layers, additionally provide shielding along sides of the sensor element. The micro tig welds may be regularly spaced or may be continuous, and may provide shielding for the sides and back of the sensor head. In some embodiments, these shield layers may be used in addition to a ground plane 912.

In other embodiments, the sensor head may comprise a thin U-shaped outer shield with two side pieces of metal attached to the U-shaped shield to form five-sided shielding. In this example, the sensor element may have only one open face where the sensor element is exposed. Those skilled in the art will recognize many alternative ways of designing a suitable shield layer.

Although in the embodiment illustrated in FIG. 9b, the sensor head comprises a thin, rectangular sensor element, in alternative embodiments, the sensor element may be substantially rectangular, so that the any one edge of the sensor element may deviate by no more than 25 percent from a straight line.

FIG. 9c illustrates a cross section through a portion of a sensor head, as in FIG. 9a or 9b, taken along the sensing edge of the sensor head. As illustrated in FIG. 9c, the sensor 914 may comprise a sensor element 930, and upper and lower shield layer 932 that surrounds the sensor element. Insulator layers 934 may separate the shield layer 932 from the sensor element 930. These components may be of any suitable shape and may be made of any suitable materials. As an example, in the embodiment illustrated, the sensor element and shield layers may be high temperature metal plates. These plates may be relatively thin layers and may comprise high-temperature nickel alloys including Inconel®, Hastelloy®, Monel®, Haynes®, and Incoloy®. In such a configuration, the sensor element may comprise a flat, rectangular piece of metal that has a top, a bottom, and a sensing edge joining the top and the bottom. All except the sensing edge may be adjacent a structure serving as part of a ground system.

In some embodiments the shield layers 932 may be actively driven by an electronics unit, such as the detector 214 shown in FIG. 2, to be at the same potential as the sensor element 930. This may raise the effective input impedance of the sensor element 930. In addition, the high input impedance may minimize any loading effects of the sensor on the object (e.g., SOFC stack) being measured and may minimize the amount of charge pulled from the object being measured.

A shielded cable may be attached between a sensor head and a processing electronics instrument (e.g., the detector/electrostatic voltmeter 214 described in FIG. 2). The shield of this cable may be actively driven to the same potential as the sensor element 930. In some embodiments, the shield of the cable may be attached to shield layers 932. In some embodiments the shielded cable may be coaxial cable 218 or may be another shielded cable connected to coaxial cable 218.

The sensor element 930, the top shield layer and the top insulator layer may have any suitable thicknesses. In some embodiments, the top insulator layer is thinner than the sensor element and the top shield layer. For example, the sensor element may be 0.8 to 1.2 mm thick, the top shield layer may be 0.5 to 1 mm thick, and the top insulator layer is 0.05 to 0.25 mm thick.

In some instances, the bottom shield and insulator layers may have the same thicknesses as the top shield and insulator layers, respectively. In other instances, the thicknesses of a top and bottom shield/insulator layer pair may be different, but the thicknesses of the top layer and the bottom layer may lie in a same range. For instance, the top and bottom insulator layers may not have the same thickness, but both may have a thickness in the range of 0.05 to 0.25 mm.

Having thus described several aspects of at least one embodiment of this invention, it is to be appreciated that various alterations, modifications, and improvements will readily occur to those skilled in the art.

As an example of possible variations, it is not a requirement that the components of a unit under test be connected serially. Though, if different connections are used, different analysis techniques may be used. For example, in exemplary embodiments described above, serially connected fuel cells, if properly functioning, yield a sequence of measurements in which the voltage increases between fuel cells following a regular and monotonically increasing pattern such that defective fuel cells are detected by significant deviations from this pattern. In embodiments in which the fuel cells, or other components of a unit under test, are connected other than in series, analysis may entail comparison of a sequence of measurements to a different pattern that need not include uniform or monotonic increases.

As another example, in exemplary embodiments described above, fuel cell stacks are tested in facility where fuel cell stacks are manufactured. Though, in some scenarios, manufacturing operations may be distributed such that any of the test processes described above take place in a facility in which only test operations are performed.

As yet another example, in the illustrative embodiments described above the shield layers of the sensor element and the shielded cable are actively driven to be at the same potential at the sensor element. Though, in alternative embodiments the shield layers and/or the shielded cable may be electrically connected to the ground plane.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, some of the embodiments (e.g., controller 222 shown in FIG. 2) may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, some processes were described to be performed under control of controller 222. It should be appreciated that control of the described processes may be performed by execution of computer-executable instructions on controller 222 or other suitable computer. Though, one or more processes may be performed under control of different or additional computers or other devices configured to act as controllers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device. Further, the computer may be physically connected to and be a part of any of the above-mentioned test systems (e.g., the test systems 200 and 300), or it may be connected via such interfaces as known in the art including, for example Ethernet, Bluetooth, WiFi, USB, the Internet, etc.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium or media) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program," "software" or "algorithm" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which examples have been provided, including methods shown in FIG. 1, FIG. 5 and FIG. 6. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of testing a unit comprising a fuel cell, the method comprising:
    obtaining at least one non-contact voltage measurement of the unit;
    determining, from the at least one non-contact voltage measurement, a voltage of the fuel cell; and
    determining whether the fuel cell contains a defect based on the determined voltage, wherein:
    obtaining the at least one non-contact voltage measurement comprises:
        obtaining a plurality of non-contact voltage measurements by scanning a non-contact voltage probe along a surface of the unit; and
        recording, for each of the plurality of non-contact voltage measurements, the non-contact voltage measurement and the corresponding location on the unit.

2. The method of claim 1, wherein:
    the at least one non-contact voltage measurement comprises a plurality of non-contact voltage measurements, each of the plurality of non-contact voltage measurements corresponding to a location on the unit.

3. The method of claim 1, wherein determining the voltage of the fuel cell comprises:
    analyzing the plurality of non-contact voltage measurements to identify a pattern indicative of the non-contact voltage probe passing the fuel cell.

4. The method of claim 1, wherein:
    the non-contact voltage probe comprises a probe of an electrostatic voltmeter.

5. The method of claim 4, wherein:
    the electrostatic voltmeter probe comprises a high-impedance passive probe or an active probe that induces a measurable potential by using an oscillating component.

6. The method of claim 1, wherein:
    the unit comprises a fuel cell stack, the fuel cell stack comprising the fuel cell, the method further comprising:
        determining a voltage for a second fuel cell in the fuel cell stack based on the plurality of non-contact voltage measurements.

7. The method of claim 6, wherein the determining whether the fuel cell contains the defect comprises:
    calculating a difference between the voltage of the fuel cell and the voltage of the second fuel cell; and
    determining that the fuel cell contains the defect when the calculated difference is below a threshold.

8. The method of claim 1, wherein:
    the non-contact voltage probe comprises a non-conducting material, wherein the material is in contact with the fuel cell stack.

9. The method of claim 1, wherein:
    the fuel cell is a solid oxide fuel cell; and
    the defect comprises a crack in the solid oxide fuel cell's electrolyte.

10. A method of testing a unit comprising a fuel cell, the method comprising:
    obtaining at least one non-contact voltage measurement of the unit;
    determining, from the at least one non-contact voltage measurement, a voltage of the fuel cell; and
    determining whether the fuel cell contains a defect based on the determined voltage, wherein:
    the method further comprises bringing the unit to an operating temperature greater than 500 degrees Celsius; and
    the at least one non-contact voltage measurement of the unit is obtained while the unit is at the operating temperature.

* * * * *